US011368836B2

(12) United States Patent
Adachi et al.

(10) Patent No.: US 11,368,836 B2
(45) Date of Patent: Jun. 21, 2022

(54) COMMUNICATION METHOD, RADIO TERMINAL, PROCESSOR, AND BASE STATION

(71) Applicant: KYOCERA Corporation, Kyoto (JP)

(72) Inventors: Hiroyuki Adachi, Kawasaki (JP); Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 47 days.

(21) Appl. No.: 16/482,225

(22) PCT Filed: Feb. 2, 2018

(86) PCT No.: PCT/JP2018/003619
§ 371 (c)(1),
(2) Date: Jul. 30, 2019

(87) PCT Pub. No.: WO2018/143416
PCT Pub. Date: Aug. 9, 2018

(65) Prior Publication Data
US 2020/0053553 A1    Feb. 13, 2020

Related U.S. Application Data

(60) Provisional application No. 62/454,201, filed on Feb. 3, 2017.

(51) Int. Cl.
*H04W 8/24*    (2009.01)
*H04W 4/40*    (2018.01)
(Continued)

(52) U.S. Cl.
CPC ............. *H04W 8/24* (2013.01); *H04W 4/021* (2013.01); *H04W 4/40* (2018.02); *H04W 72/02* (2013.01); *H04W 76/27* (2018.02); *H04W 92/18* (2013.01)

(58) Field of Classification Search
CPC ....... H04W 8/22; H04W 4/021; H04W 76/14; H04W 72/048; H04W 72/02; H04W 76/27; H04W 8/24; H04W 4/40
See application file for complete search history.

(56) References Cited

U.S. PATENT DOCUMENTS

2013/0288645 A1*  10/2013  Zheng ................... H04W 76/14
                                                       455/411
2015/0264677 A1*  9/2015  He ......................... H04W 8/005
                                                       370/312

(Continued)

OTHER PUBLICATIONS

Nokia et al.; "On resource selection for V2P communication"; 3GPP TSG RAN WG1 Meeting #86bis; R1-1609787 Oct. 10-14, 2016; pp. 1-4; Lisbon, Portugal.

(Continued)

*Primary Examiner* — Anez C Ebrahim
(74) *Attorney, Agent, or Firm* — Studebaker & Brackett PC

(57) ABSTRACT

A communication method according to one embodiment comprises the steps of transmitting capability of a radio terminal, which is a pedestrian user equipment (UE), from the radio terminal to a base station, receiving, by the base station, the capability of the radio terminal from the radio terminal, and individually transmitting, from the base station to the radio terminal, information of a radio resource pool for direct terminal-to-terminal communication based on the capability of the radio terminal. The information of the radio resource pool is information of a resource pool based on a geographical zone.

12 Claims, 10 Drawing Sheets

(51) Int. Cl.
  *H04W 76/27*   (2018.01)
  *H04W 4/021*   (2018.01)
  *H04W 72/02*   (2009.01)
  *H04W 92/18*   (2009.01)

(56) References Cited

U.S. PATENT DOCUMENTS

2017/0285177 A1* 10/2017 Jin .......................... G01S 19/42
2017/0359835 A1* 12/2017 Seo ....................... H04W 72/14

OTHER PUBLICATIONS

Fujitsu; "Discussion on power saving for V2P communications"; 3GPP TSG-RAN WG2 Meeting#95b; R2-166489; Oct. 10-14, 2016; pp. 1-2; Kaohsiung, Taiwan.
ZTE; "Discussion on V2P aspects"; 3GPP TSG-RAN WG2 Meeting #95bis; R2-166609; Oct. 10-14, 2016; pp. 1-4; Kaohsiung, Taiwan.
Kyocera; "Consideration of the P2V transmission scheme"; 3GPP TSG-RAN WG2 #95bis; R2-166861; Oct. 10-14, 2016; pp. 1-3; Kaohsiung, Taiwan.
Kyocera; "Consideration of the zone based configuration for P2V"; 3GPP TSG-RAN WG2 #97; R2-1701674; Feb. 17-19, 2017; pp. 1-3; Athens, Greece.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); 3GPP TS 36.300 V13.4.0; Jun. 2016, pp. 1-310, Valbonne, France.

* cited by examiner

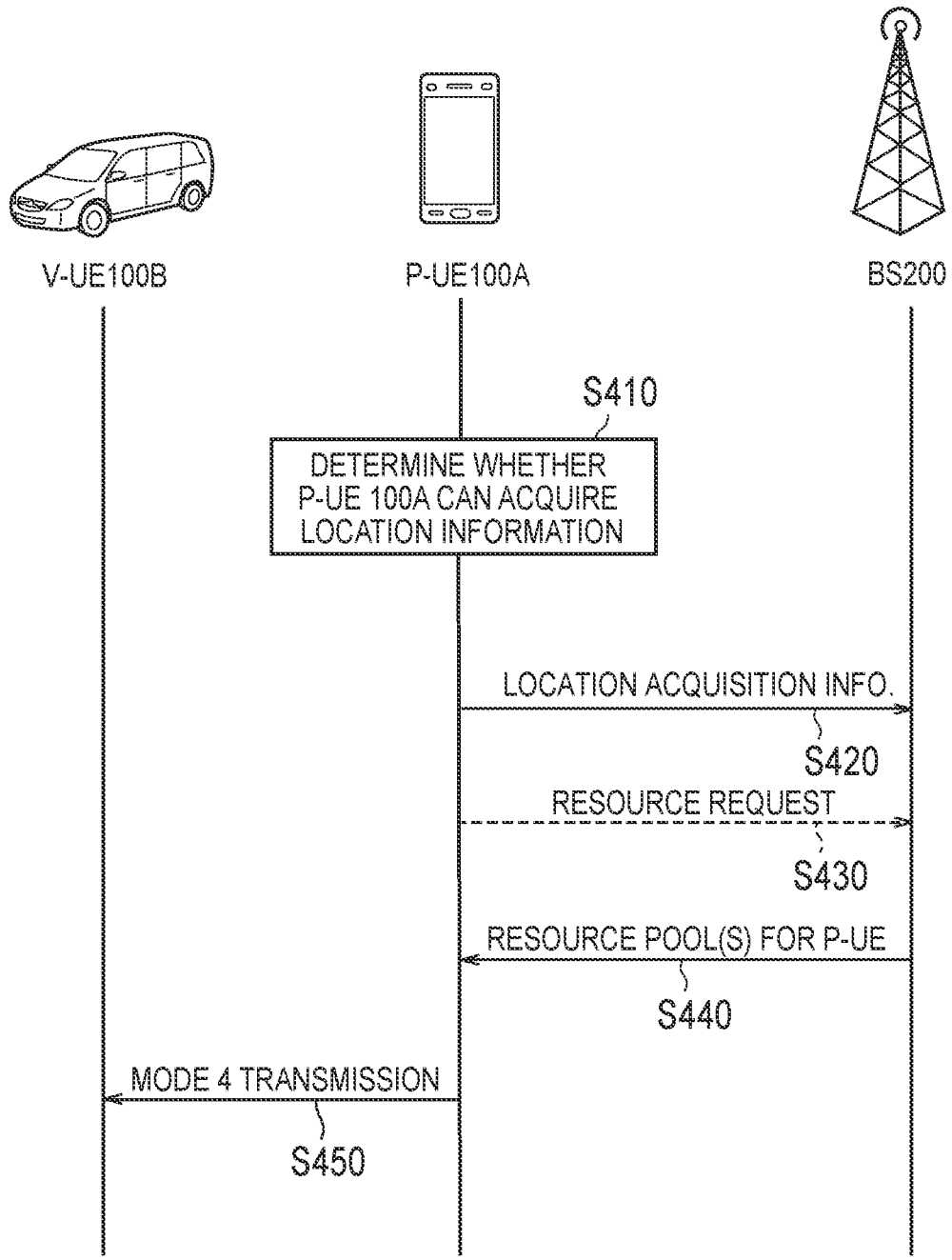

COMMUNICATION METHOD, RADIO TERMINAL, PROCESSOR, AND BASE STATION

TECHNICAL FIELD

The present disclosure relates to a communication method, a radio terminal, a processor, and a base station.

BACKGROUND ART

In the 3rd Generation Partnership Project (3GPP) which is a standardization project for mobile communication systems, specifications of direct signaling (sidelink) between terminals is being developed (see Non patent Literature 1).

CITATION LIST

Non Patent Literature

Non patent Literature 1: 3GPP Technical specification "TS36.300 V13.4.0" Jul. 7, 2016

SUMMARY OF INVENTION

A communication method according to one embodiment comprises the steps of transmitting capability of a radio terminal, which is a pedestrian user equipment (UE), from the radio terminal to a base station, receiving, by the base station, the capability of the radio terminal from the radio terminal, and individually transmitting, from the base station to the radio terminal, information of a radio resource pool for direct terminal-to-terminal communication based on the capability of the radio terminal. The information of the radio resource pool is information of a resource pool based on a geographical zone.

A radio terminal according to one embodiment is a pedestrian user equipment (UE). The radio terminal comprises a transmitter and a receiver. The transmitter is configured to transmit capability of the radio terminal to a base station. The receiver is configured to individually receive, from the base station, information of a radio resource pool for direct terminal-to-terminal communication after the transmission of the capability. The information of the radio resource pool is information of a resource pool based on a geographical zone.

A processor according to one embodiment is a processor for controlling a radio terminal which is a pedestrian user equipment (UE). The processor performs the processing of transmitting capability of a radio terminal to a base station, and individually receiving, from the base station, information of the radio resource pool for direct terminal-to-terminal communication after the transmission of the capability. The information of the radio resource pool is information of a resource pool based on a geographical zone.

A base station according to one embodiment comprises a receiver and a transmitter. The receiver is configured to receive, from a radio terminal which is a pedestrian user equipment (UE), capability of the radio terminal. The transmitter is configured to individually transmit information of a radio resource pool for direct terminal-to-terminal communication to the radio terminal based on the capability of the radio terminal. The information of the radio resource pool is information of a resource pool based on a geographical zone.

A processor according to one embodiment is a processor for controlling a base station. The processor performs the processing of receiving, from a radio terminal which is a pedestrian user equipment (UE), capability of the radio terminal, and individually transmitting, to the radio terminal, information of a radio resource pool for direct terminal-to-terminal communication based on the capability of the radio terminal. The information of the radio resource pool is information of a resource pool based on a geographical zone.

BRIEF DESCRIPTION OF DRAWINGS

FIG. 12 is a sequence diagram for describing Operation Example 3 (operation pattern 2).

DESCRIPTION OF EMBODIMENTS

Summary of Embodiments

Figure 1:
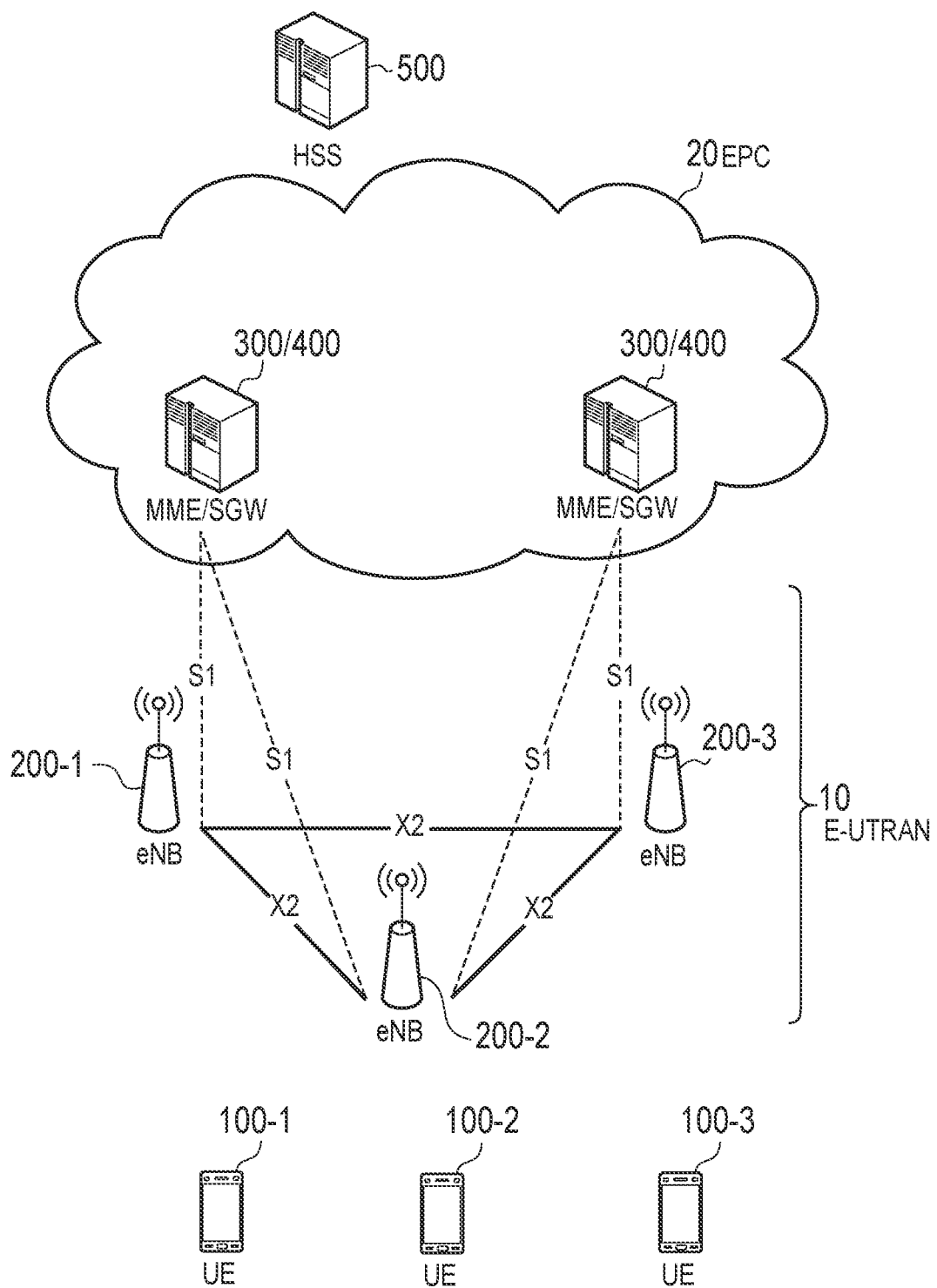
FIG. 1 is a diagram illustrating a configuration of an LTE system.

A communication method according to an embodiment includes the steps of: transmitting capability of a radio terminal, which is a pedestrian user equipment (UE), from the radio terminal to a base station; and receiving, by the base station, the capability of the radio terminal from the radio terminal; and individually transmitting, from the base station to the radio terminal, information of a radio resource pool for direct terminal-to-terminal communication based on the capability of the radio terminal. The information of the radio resource pool is information of a resource pool based on a geographical zone.

The communication method may include the step of determining whether the base station transmits the information of the radio resource pool based on location information of the radio terminal.

The communication method may include the steps of: transmitting, from the radio terminal to the base station, information for requesting a radio resource pool for the direct terminal-to-terminal communication; and receiving, by the base station, the information from the radio terminal. In the step of transmitting the information of the radio resource pool, the information of the radio resource pool may be individually transmitted from the base station to the radio terminal in response to the reception of the information.

The radio terminal according to an embodiment is a radio terminal which is a pedestrian user equipment (UE). The radio terminal includes a transmitter and a receiver. The transmitter is configured to transmit the capability of the radio terminal to the base station. The receiver is configured to individually receive, from the base station, the information of the radio resource pool for the direct terminal-to-terminal communication after the transmission of the capability. The information of the radio resource pool is information of a resource pool based on a geographical zone.

A processor according to an embodiment is a processor for controlling a radio terminal which is a pedestrian user equipment (UE). The processor performs processing of transmitting the capability of the radio terminal to the base station and processing of individually receiving, from the base station, the information of the radio resource pool for the direct terminal-to-terminal communication after the transmission of the capability. The information of the radio resource pool is information of a resource pool based on a geographical zone.

A base station according to an embodiment includes a receiver and a transmitter. The receiver is configured to receive the capability of the radio terminal from the radio terminal which is the pedestrian user equipment (UE). The transmitter is configured to individually transmit the information of the radio resource pool for the direct terminal-to-terminal communication to the radio terminal based on the capability of the radio terminal. The information of the radio resource pool is information of a resource pool based on a geographical zone.

The processor according to an embodiment is a processor for controlling a base station. The processor performs processing of receiving the capability of the radio terminal from the radio terminal which is the pedestrian user equipment (UE), and processing of individually transmitting the radio resource pool for the direct terminal-to-terminal communication to the radio terminal based on the capability of the radio terminal. The information of the radio resource pool is information of a resource pool based on a geographical zone.

In recent years, discussions about pedestrian-to-vehicle (P2V) communication between a radio terminal (pedestrian UE: P-UE) having a pedestrian type function and a radio terminal (vehicle UE: VUE) having a vehicle type function is being conducted.

However, the current specifications do not define the P-UE as a radio resource available for P2V communication. For this reason, there is a possibility that the P2V communication cannot be properly performed.

The radio terminal according to an embodiment has the pedestrian type function. The radio terminal includes a transmitter configured to perform direct terminal-to-terminal communication with another radio terminal having a vehicle type function, a receiver configured to receive information of a resource pool transmitted to the radio terminal having a pedestrian type function from a base station; and a controller configured to determine whether the resource pool is available for the terminal-to-terminal communication according to a type of the resource pool.

The controller may be configured to determine whether the resource pool is available in response to the type of the resource pool and the capability of the radio terminal.

The controller may be configured to determine that the resource pool is available in response to the resource pool being a resource pool which requires sensing in order to use the resource pool.

The resource pool may be a resource pool that does not require sensing in order to use the resource pool. The controller may be configured to determine that the resource pool is available in response to the radio terminal not having reception capability in the terminal-to-terminal communication.

The controller is configured to start control to transition from a radio resource control (RRC) idle state to an RRC connected state according to the determination that the resource pool is unavailable in order to request the base station for the radio resource for the terminal-to-terminal communication, when the radio terminal is in the RRC idle state.

The controller may be configured to include, in a message for requesting the radio resource, information indicating whether the radio terminal has the pedestrian type function. The transmitter may be configured to transmit the message to the base station.

The transmitter may be configured to transmit, to the base station, information indicating whether the radio terminal has the pedestrian type function.

The base station according to an embodiment may include a receiver configured to receive, from a first radio terminal having a pedestrian type function, a message requesting a radio resource for direct terminal-to-terminal communication with a second radio terminal having a vehicle type function and a controller configured to determine a radio resource allocated to the first radio terminal according to capability of the first radio terminal.

The controller may be configured to allocate, as the radio resource, the resource pool which requires sensing when the first radio terminal has a reception capability in the terminal-to-terminal communication.

The base station may further include a transmitter configured to notify the first radio terminal of information indicating at least one of a cell and a frequency for recommending the terminal-to-terminal communication between the radio terminal having the pedestrian type function and the radio terminal having the vehicle type function.

Embodiment (Mobile Communication System)

An LTE system which is a mobile communication system according to an embodiment will be described. FIG. 1 is a diagram illustrating a configuration of an LTE system.

As illustrated in FIG. 1, the LTE system includes a user equipment (UE) 100, an evolved universal terrestrial radio access network (E-UTRAN) 10, and an evolved packet core (EPC) 20.

A UE 100 corresponds to a communication apparatus (for example, a radio terminal). The UE 100 is a mobile communication apparatus.

The UE 100 may be a radio terminal having a pedestrian type function. For example, the UE 100 is a radio terminal portable by a pedestrian. The UE 100 may have a pedestrian type function permanently. The UE 100 may have the pedestrian type function only when predetermined conditions are satisfied.

Figure 4:
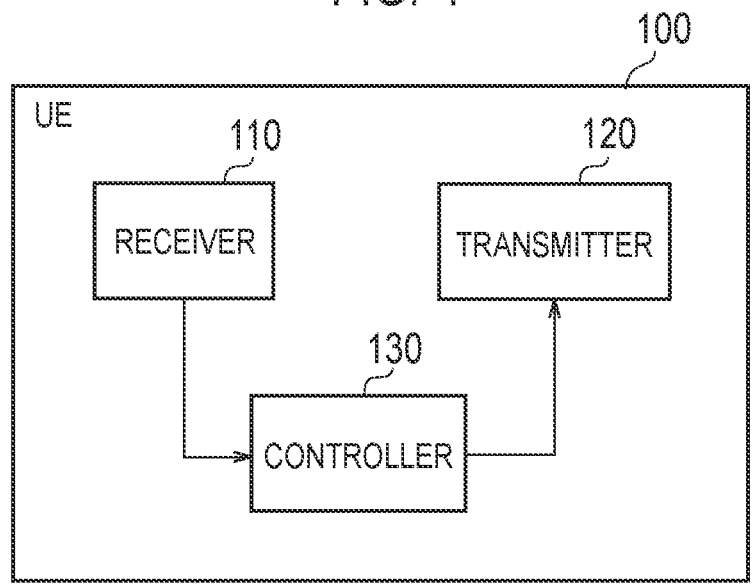
FIG. 4 is a block diagram of a UE 100.

When the UE 100 has a battery for supplying power to the UE 100 (each equipment (for example, a receiver 110, a transmitter 120, and a controller 130 illustrated in FIG. 4 to be described later)), the UE 100 may have the pedestrian type function. When the UE 100 does not have the battery, that is, when power is supplied to the UE 100 from the outside, the UE 100 may not have the pedestrian type function.

The UE 100 may have the pedestrian type function, when executing or stopping low speed movement. The UE 100 may have the pedestrian type function only when a moving speed is less than a threshold (for example, 10 km/h) indicating the slow movement. The UE 100 may not have the pedestrian type function when the moving speed is equal to or greater than the threshold.

The UE 100 may have the pedestrian type function only when an acceleration is less than the threshold. The UE 100 may not have the pedestrian type function when the acceleration is equal to or greater than the threshold.

The UE 100 may have the pedestrian type function when the UE 100 is desired to use a radio resource (resource pool) for a pedestrian UE (P-UE) 100. The UE 100 may have the pedestrian type function when the UE 100 is interested in using the radio resource (resource pool) for the P-UE 100. The UE 100 may not have the pedestrian type function when the UE 100 is not desired to use the radio resource (resource pool) for the P-UE 100. The UE 100 may not have the pedestrian type function when the UE 100 is not interested (no longer interested) in using the radio resource (resource pool) for the P-UE 100.

The UE 100 may have the pedestrian type function when the UE 100 is not mounted on a vehicle. The UE 100 may not have the pedestrian type function when the UE 100 is mounted on a vehicle.

The UE 100 may have the pedestrian type function when the UE 100 is estimated to be the P-UE 100. For example, the UE 100 may be estimated to be the P-UE 100 when being a UE 100 which should avoid a vehicle collision. The UE 100 may be estimated to be the P-UE 100 when the UE 100 is a UE 100 with which a vehicle should be careful. The UE 100 may have the pedestrian type function when the UE 100 is estimated to be a UE 100 that a vehicle-to-pedestrian holds.

The UE 100 may have the pedestrian type function only when the UE 100 starts (performs) a predetermined application (for example, an application related to an operation of a pedestrian). The UE 100 may not have the pedestrian type function when the UE 100 does not start (perform) the predetermined application.

The UE 100 may not have the pedestrian type function only when the UE 100 does not start (perform) the predetermined application (for example, an application related to an operation of a vehicle). The UE 100 may have the pedestrian type function when the UE 100 does not start (perform) the predetermined application.

The UE 100 may be a radio terminal having the vehicle type function. For example, the UE 100 may be a vehicle (vehicle UE (VUE) 100) having a communication function. The UE 100 may be a vehicle itself (for example, a car, a motorcycle, and the like). The UE 100 may be a communication module that is detachable from a vehicle. The UE 100 may have the vehicle type function permanently. The UE 100 may have the vehicle type function only when predetermined conditions are satisfied. The predetermined conditions are at least one of the following.

The UE 100 may have the vehicle type function when the UE 100 does not have a battery. The UE 100 may not have the vehicle type function when the UE 100 has the battery.

The UE 100 may have the vehicle type function when the UE 100 performs a high-speed movement. The UE 100 may have the vehicle type function only when a moving speed is equal to or greater than the threshold (for example, 10 km/h) indicating the high-speed movement. The UE 100 may not have the vehicle type function when the moving speed is less than the threshold. The UE 100 may (temporarily) lose the vehicle type function only when a period in which the moving speed falls below the threshold indicating the high-speed movement passes a predetermined period. The UE 100 may have the vehicle type function when the period in which the moving speed falls below the threshold indicating the high-speed movement does not pass the predetermined period.

The UE 100 may have the vehicle type function only when an acceleration is equal to or greater than the threshold. The UE 100 may not have the vehicle type function when the acceleration is less than the threshold. The UE 100 may (temporarily) lose the vehicle type function only when the period in which the acceleration falls below the threshold passes the predetermined period. The UE 100 may have the vehicle type function when the period in which the acceleration falls below the threshold does not pass the predetermined period.

The UE 100 may have the vehicle type function when the UE 100 is mounted on a vehicle. The UE 100 may have the vehicle type function when the UE 100 is not mounted on a vehicle.

The UE 100 may have the vehicle type function when the UE 100 is estimated to be the V-UE 100. For example, the UE 100 may be estimated to be the V-UE 100 when the UE 100 is a UE 100 which should avoid a collision with a P-UE 100A. The UE 100 may be estimated to be the V-UE 100 when the UE 100 is careful with the P-UE 100A. The UE 100 may have the vehicle type function when the UE 100 is estimated to be a UE 100 mounted on a vehicle.

The UE 100 may have the vehicle type function only when the UE 100 starts (performs) a predetermined application (for example, an application related to an operation of a vehicle). The UE 100 may not have the vehicle type function when the UE 100 does not start (perform) the predetermined application.

The UE 100 may not have the vehicle type function only when the UE 100 does not start (perform) the predetermined application (for example, an application related to an operation of a pedestrian). The UE 100 may have the vehicle type function when the UE 100 does not start (perform) the predetermined application.

The UE 100 may perform radio communication (uplink/downlink) with a cell (eNB 200 described later). The UE 100 may be able to perform transmission and/or reception of direct signaling with other communication apparatuses. For example, the UE 100 can perform pedestrian-to-vehicle (P2V) communication. The UE 100 may perform vehicle-to-everything (V2X) communication (for example, at least any of vehicle-to-vehicle communication (V2V) communication and vehicle-to-infrastructure (V2I) communication).

An E-UTRAN 10 corresponds to a radio access network. The E-UTRAN 10 includes an evolved Node-B (eNB) 200. The eNB 200 corresponds to a base station. The eNBs 200 are connected to each other via an X2 interface. An operation of the eNB 200 may be regarded as an operation of the E-UTRAN 10.

The eNB 200 manages one or a plurality of cells. The eNB 200 performs radio communication with the UE 100 which establishes a connection to a cell that the eNB 200 manages. The eNB 200 has a radio resource management (RRM) function, a routing function of user data (hereinafter, sometimes referred to as "data"), a measurement control function for mobility control and scheduling, and the like. The "cell" is used as a term to indicate a smallest unit of a radio communication area. The "cell" may also be used as a term indicating a function of performing the radio communication with the UE 100.

An EPC 20 corresponds to a core network. The EPC 20 may configure a network with the E-UTRAN 10. The EPC 20 includes a mobility management entity (MME) 300 and a serving gateway (SGW) 400.

The MME 300 performs, for example, various mobility controls on the UE 100. The SGW 400 performs, for example, a data transfer control. The MME 300 and the SGW 400 are connected to the eNB 200 via an S1 interface.

A home subscriber server (HSS) 500 may be provided outside the EPC 20. The HSS 500 is a node (NW apparatus) which manages subscriber information of the UE 100.

Figure 2:
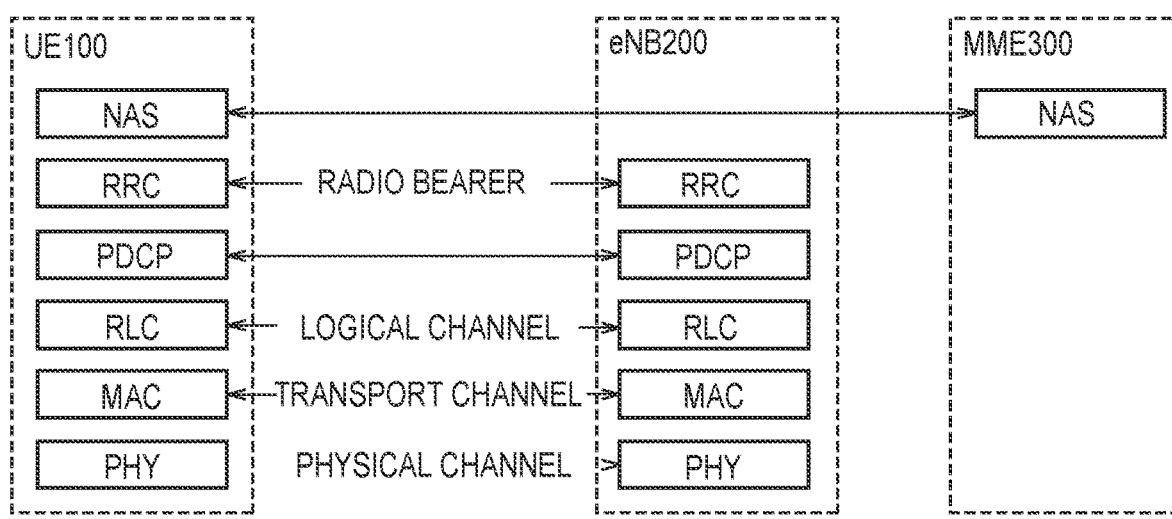
FIG. 2 is a protocol stack diagram of a radio interface in the LTE system.

FIG. 2 is a protocol stack diagram of a radio interface in the LTE system. As illustrated in FIG. 2, a radio interface protocol is divided into first to third layers of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding and decoding, modulation and demodulation, antenna mapping and demapping, and resource mapping and demapping. Data and control signals are transmitted between the physical layer of the UE 100 and the physical layer of the eNB 200 via a physical channel.

The MAC layer performs priority control of data, retransmission processing by hybrid ARQ (HARQ), a random access procedure, and the like. The data and control signals are transmitted between the MAC layer of the UE 100 and the MAC layer of the eNB 200 via a transport channel. The MAC layer of the eNB 200 includes a scheduler (MAC scheduler). The scheduler determines uplink and downlink transport formats (transport block size, modulation and encoding scheme (MCS)) and a resource block allocated to the UE 100.

An RLC layer transmits data to an RLC layer on a receiving side using the functions of the MAC layer and the physical layer. The data and control signals are transmitted between the RLC layer of the UE 100 and the RLC layer of the eNB 200 via a logical channel.

A PDCP layer performs header compression and decompression, and encoding and decoding.

The RRC layer is defined only in a control plane that handles the control signal. A message (RRC message) for various configurations is transmitted between the RRC layer of the UE 100 and the RRC layer of the eNB 200. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in an RRC connected state. When there is no RRC connection between the RRC of the UE 100 and the RRC of the eNB 200, the UE 100 is in an RRC idle state.

A non-access stratum (NAS) layer located at an upper layer of the RRC layer performs, for example, session management and mobility management.

Figure 3:
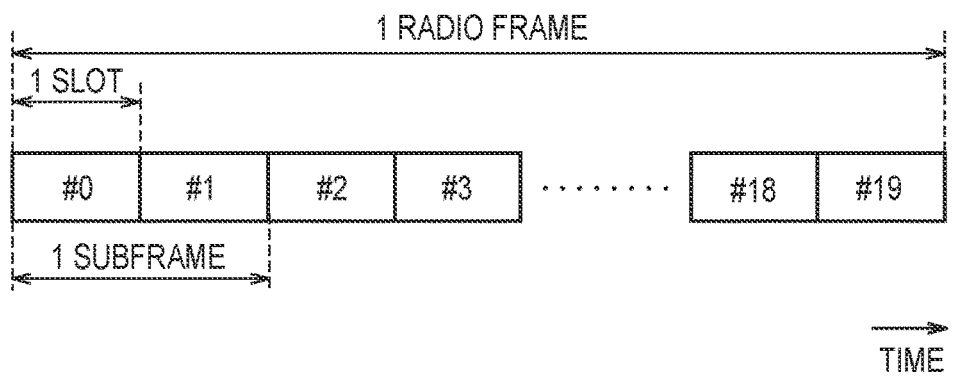
FIG. 3 is a configuration diagram of a radio frame used in the LTE system.

FIG. 3 is a configuration diagram of a radio frame used in the LTE system. In the LTE system, an orthogonal frequency division multiple access (OFDMA) is applied to the downlink. A single carrier frequency division multiple access (SC-FDMA) is applied to the uplink.

As illustrated in FIG. 3, the radio frame consists of 10 subframes aligned in a time direction. Each subframe consists of two slots aligned in the time direction. A length of each subframe is 1 ms. A length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. Radio resources (time and frequency resources) are allocated to the UE 100, in which one resource element (RE) is constituted, by one symbol and one subcarrier. In the frequency direction, the radio resources (frequency resources) consist of the resource blocks. In the time direction, the radio resources (time resources) consist of subframes (or slots).

In the downlink, a section of several head symbols of each subframe is an area which can be used as a physical downlink. control channel (PDCCH) for transmitting downlink control signals. The remaining part of each subframe is an area which can be used as a physical downlink shared channel (PDSCH) for transmitting downlink data.

In the uplink, both end portions in the frequency direction in each subframe is an area which can be used as a physical uplink control channel (PUCCH) for transmitting uplink control signals. The remaining part of each subframe is an area which can be used as a physical uplink shared channel (PUSCH) for transmitting uplink data.

(Proximity-Based Service)

A proximity-based service (ProSe) will be described. The proximity-based service is a service which may be provided by the 3GPP system based on communication apparatuses (for example, UE 100) which are in proximity to each other.

In the ProSe, various radio signals are directly transmitted and received between nodes (for example, between UEs) via a direct radio link without passing through a network (for example, eNB 200). The direct radio link in the ProSe is called a "sidelink".

The sidelink may be an interface (for example, an interface between the UEs) for sidelink communication and sidelink discovery. The sidelink communication is a function (AS functionality) that enables ProSe direct communication (hereinafter, referred to as "direct communication" as appropriate). The sidelink discovery is a function (AS functionality) that enables the ProSe discovery (hereinafter, referred to as "discovery" as appropriate).

The sidelink corresponds to a PC5 interface. The PC5 is a reference point between the ProSe direct discovery, a control plane for the ProSe direct communication and a ProSe UE and network relay, and a ProSe-enabled UE used for the user plane.

In the ProSe, the "direct discovery" and the "direct communication" and "relay" modes are defined. The "relay" will be described later.

The direct discovery may be, for example, a mode in which a discovery message (discovery signal) that does not designate a specific destination is directly transmitted between the UEs to search the other party. The direct discovery may be a procedure for discovering other UEs in proximity to the UE using a direct radio signal in an evolved universal terrestrial radio access (E-UTRA) via the PC5. The direct discovery may be a procedure employed by the UE 100 capable of performing the proximity-based service in order to discover other UEs 100 capable of performing the proximity-based service by using only capabilities of two UEs 100 with the E-UTRA technology. The direct discovery may be supported only when the UE 100 receives a service provided by the E-UTRAN (eNB 200 (cell)). When the UE 100 is connected to the cell (eNB 200) or exists in the cell, the service may be provided by the E-UTRAN.

There are "type 1" and "type 2 (type 2B)" as resource allocation types for transmission (announcement) of a discovery message (discovery signal). In the "type 1", the UE 100 selects a radio resource. In the "type 2 (type 2B)", the eNB 200 allocates a radio resource. In the type 1, the UE 100 may select the radio resource from the resource pool provided from the eNB 200.

The "sidelink direct discovery" protocol stack includes the physical (PHY) layer, the MAC layer, and the ProSe protocol.

The direct communication may be, for example, a mode in which data are directly transmitted between the UEs by specifying a specific destination (destination group). The direct communication may be communication between two or more UEs capable of performing the proximity-based service by a user plane transmission using the E-UTRA technology via a path not passing through any network node.

There are "mode 1" and "mode 2" as the resource allocation types for the direct communication. In the "mode 1", the eNB 200 designates the radio resource for the direct communication. In the "mode 2", the UE 100 selects the radio resource for the direct communication. In the mode 2, the UE 100 may select the radio resource from the resource pool provided from the eNB 200.

A protocol stack of a user plane in sidelink communication (direct communication) in the PC5 includes a physical (PHY) layer, an MAC layer, an RLC layer, and a PDCP layer. A protocol stack of a user plane for a sidelink broadcast control channel (SBCCH) in the PC5 includes a physical (PHY) layer, an MAC layer, an RLC layer, and a RRC layer. A protocol stack of a control plane for one-to-one sidelink communication includes a physical (PHY) layer, an MAC layer, an RLC layer, a PDCP layer, and a PC5 signaling protocol.

In the sidelink, various types of information are transmitted by using the following channels.

Examples of the physical channel for the sidelink include a physical sidelink broadcast channel (PSBCH), a physical sidelink discovery channel (PSDCH), a physical sidelink control channel (PSCCH), and a physical sidelink shared channel (PSSCH).

The PSBCH is a channel for transmitting system and synchronization related information (for example, synchronization signal). The PSDCH is a channel for transmitting a sidelink discovery message (discovery signal) from the UE. The PSCCH is a channel for transmitting control information from the UE for the sidelink communication. The PSSCH is a channel for transmitting data from the UE for the sidelink communication.

Examples of the transport channel related to the sidelink include a sidelink broadcast channel (SL-BCH), a sidelink discovery channel (SL-DCH), and a sidelink shared channel (SL-SCH). The SL-BCH is mapped to the PSBCH. The SL-DCH is mapped to the PSDCH. The SL-SCH is mapped to the PSSCH.

Examples of the logical channel (control channel, traffic channel) related to the sidelink include a sidelink broadcast control channel (SBCCH) and a sidelink traffic channel (STCH).

The SBCCH is a sidelink channel for broadcasting sidelink system information from one UE to other UE(s). The STCH is a point-to-multipoint channel for transmitting user information (data) from one UE to other UE(s). The STCH is used only in the UE capable of performing the sidelink communication. The STCH may be used for point-to-point communication between the UEs capable of performing two sidelink communications. The STCH is mapped to the SL-SCH. The SBCCH is mapped to the SL-BCH.

(Radio Terminal)

A description will be given of the UE 100 (radio terminal) according to the embodiment. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of reception under control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmission under control of the controller 130. The transmitter 120 includes an antenna. The transmitter 120 converts the baseband signal (transmission signal) output by the controller 130 into a radio signal. The transmitter 120 transmits the radio signal from the antenna.

The controller 130 performs various types of control at the UE 100. The controller 130 includes a processor and a memory. The memory stores programs to be executed by the processor, and information to be used in processing by the processor. The processor includes a baseband processor and a central processing unit (CPU). For example, the baseband processor performs modulation/demodulation and coding/decoding of a baseband signal. The CPU performs various processes by executing the programs stored in the memory. The processor may include a codec for performing coding and decoding of audio/video signals. The processor executes various processes described later and various communication protocols described above.

The UE 100 may include a global navigation satellite system (GNSS) receiver. The GNSS receiver may receive a GNSS signal to obtain positional information indicating a geographical position of the UE 100. The GNSS receiver outputs the GNSS signal to the controller 130. The UE 100 may include a global positioning system (GPS) function for acquiring the positional information of the UE 100. The UE 100 may include function to predict position such as electronic compass and acceleration sensor.

The UE 100 is a communication device which includes a function capable of performing transmission and/or reception of direct signaling with another communication device. Therefore, the UE 100 may of course include other configurations (for example, functions, elements, and the like).

In the present specification, for the sake of convenience, a process that is performed by at least one of the receiver 110, the transmitter 120, or the controller 130 provided in the UE 100 is described as a process (operation) that is performed by the UE 100.

(Base Station)

Figure 5:
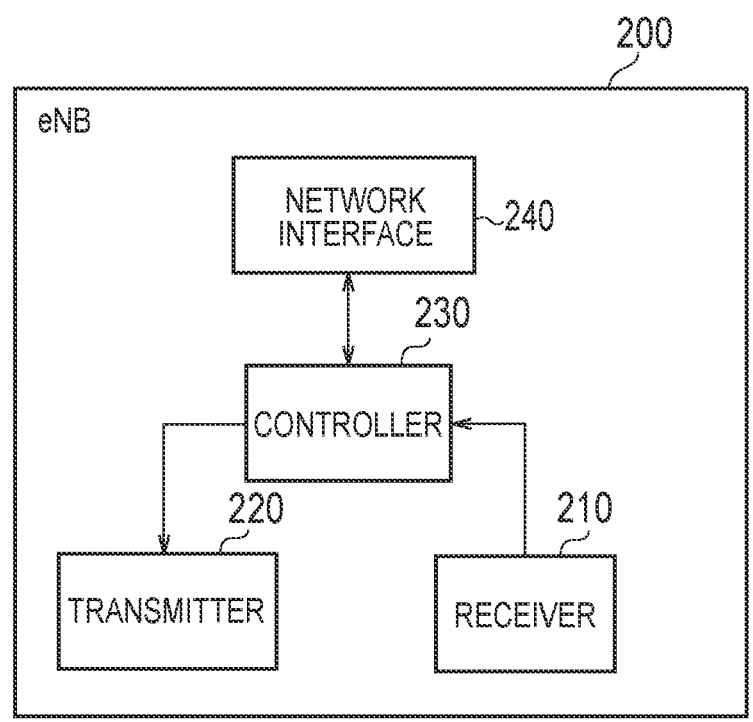
FIG. 5 is a block diagram of an eNB 200.

A description will be given of the eNB 200 (base station) according to the embodiment. FIG. 5 is a block diagram of the eNB 200. As illustrated in FIG. 5, the eNB 200 includes a receiver 210, a transmitter 220, a controller 230, and a network interface 240. The receiver 210 and the transmitter 220 may be an integrated transceiver.

The receiver 210 performs various types of reception under control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmission under control of the controller 230. The transmitter 220 includes an antenna. The transmitter 220 converts the baseband signal (transmission signal) output by the controller 230 into a radio signal. The transmitter 220 transmits the radio signal from the antenna.

The controller 230 performs various types of control at the eNB 200. The controller 230 includes a processor and a memory. The memory stores programs to be executed by the processor, and information to be used in processing by the processor. The processor includes a baseband processor and a CPU. For example, the baseband processor performs modulation/demodulation and coding/decoding of a baseband signal. The CPU performs various processes by executing the programs stored in the memory. The processor executes various processes described later and various communication protocols described above.

The network interface 240 is connected to an adjacent eNB 200 via the X2 interface. The network interface 240 is connected to the MME 300 and the SGW 400 via the S1 interface. For example, the network interface 240 is used for communication performed on the X2 interface and communication performed on the S1 interface.

In the present specification, for the sake of convenience, a process that is performed by at least one of the receiver 210, the transmitter 220, the controller 230, or the network interface 240 provided in the eNB 200 is described as a process (operation) that is performed by the eNB 200.

Operation According to Embodiment

The operation according to the embodiment will be described by the following Operation Examples 1 and 2.

(A) Operation Example 1

Figure 6:
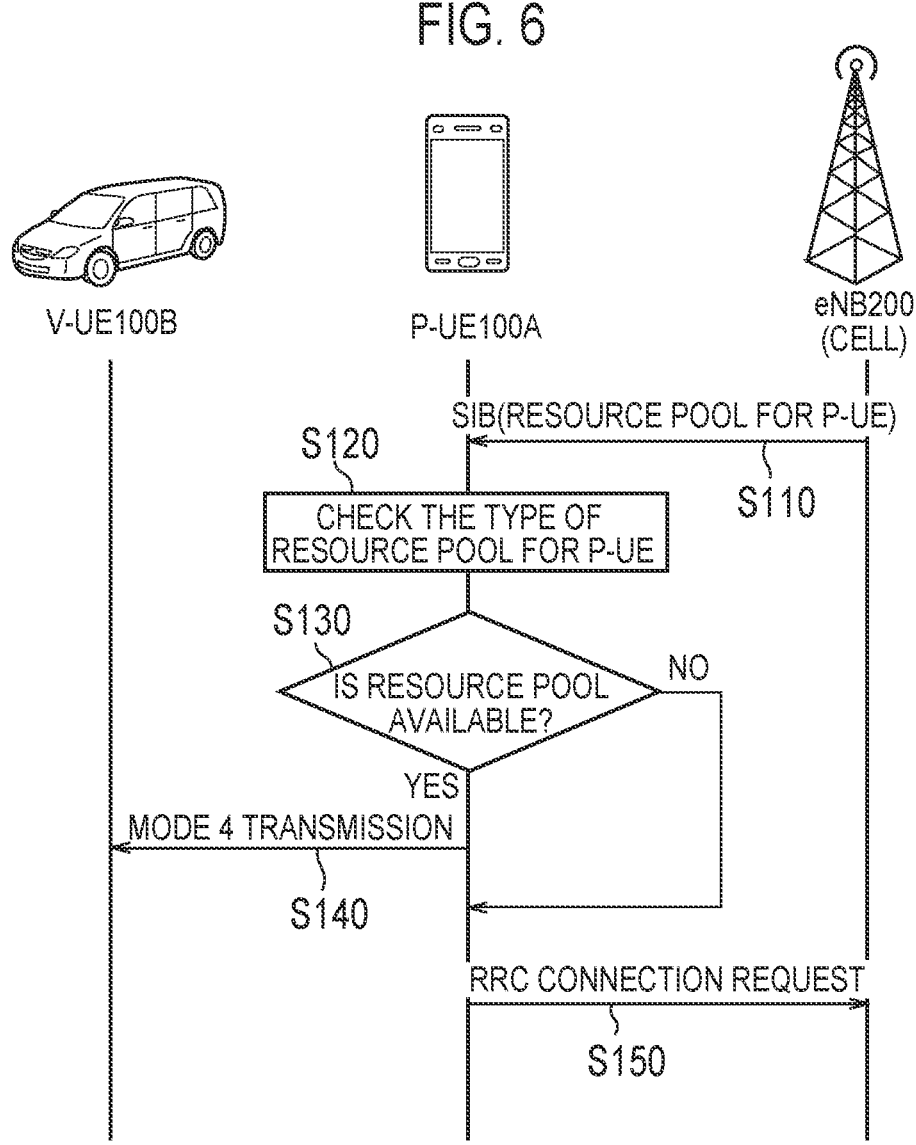
FIG. 6 is a sequence diagram (part 1) for describing Operation Example 1.
Figure 7:
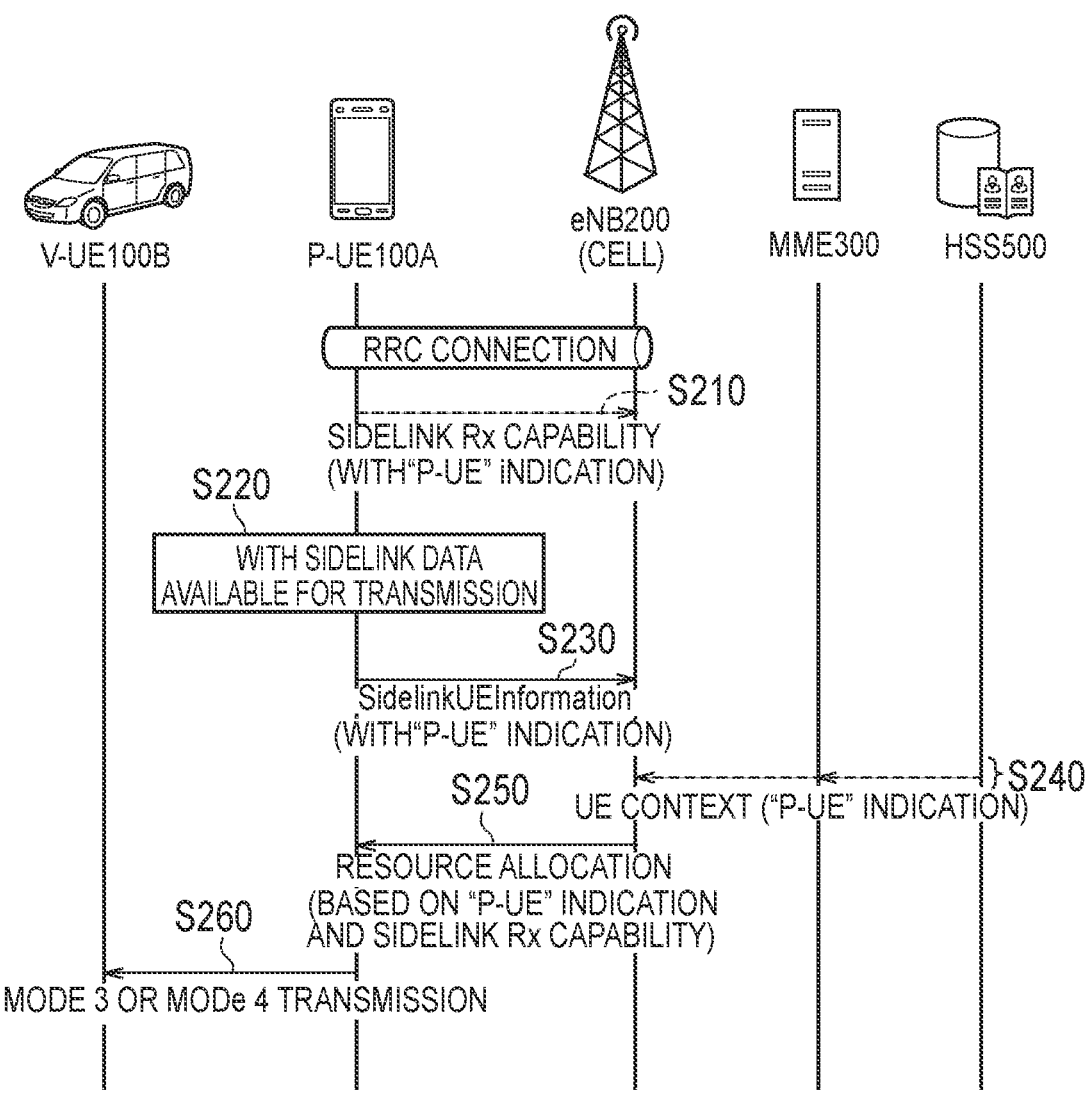
FIG. 7 is a sequence diagram (part 2) for describing Operation Example 1.

Operation Example 1 will be described with reference to FIGS. 6 and 7. FIG. 6 is a sequence diagram (part 1) for describing Operation Example 1. FIG. 7 is a sequence diagram (part 1) for describing Operation Example 2.

(a) Operation in RRC Idle State

In FIG. 6, a P-UE 100A has a pedestrian type function. In an initial state, the P-UE 100A is in an RRC idle state. The P-UE 100A may camp on a cell managed by an eNB 200. A V-UE 100B has a vehicle type function.

In step S110, the eNB 200 transmits information of a resource pool for a P-UE to the P-UE 100A. The P-UE 100A receives, from the eNB 200, the information of the resource pool transmitted toward the P-UE 100A.

The eNB 200 may transmit the information of the resource pool to the P-UE 100A by broadcast signaling (for example, system information block (SIB)).

The resource pool consists of a plurality of time and frequency resources. The resource pool is a resource pool for terminal-to-terminal communication. Specifically, the resource pool is a resource pool for P2V communication. The terminal-to-terminal communication is, for example, communication (transmission/reception) using a sidelink (proximity-based service).

The resource pool may be a resource pool (first resource pool) which requires sensing in order to use the resource pool. The P-UE 100A senses a first resource pool when using a first resource pool. That is, the P-UE 100A attempts to monitor a radio signal (in particular, a direct radio signal for P2V communication) in at least a part of radio resources of the first resource pool. The P-UE 100A determines unused radio resources according to the sensing result. The P-UE 100A performs P2V communication using the unused radio resources. The sensing time may be shorter than the sensing time required for the V-UE 100B to perform V2V (or V2X) communication. Thereby, the P-UE 100A can reduce power consumption.

Since the first resource pool requires sensing, only the P-UE 100 having reception capability (for example, Sidelink Rx Capability) in the terminal-to-terminal communication may be available. The P-UE 100 which does not have the reception capability in the terminal-to-terminal communication cannot use the first resource pool.

The P-UE 100A can receive the radio signal transmitted in the terminal-to-terminal communication when having the reception capability in the terminal-to-terminal communication. The P-UE 100A cannot receive the radio signal transmitted in the terminal-to-terminal communication when not having the reception capability in the terminal-to-terminal communication.

The resource pool may be a second resource pool which does not require the sensing in order to use the resource pool. The second resource pool may be an exceptional resource pool of the first resource pool. The second resource pool may be available only when the first resource pool is unavailable.

The P-UE 100A may randomly select a radio resource for P2V communication from the second resource pool. The transmission using the radio resource in the second resource pool may be permitted only by the P-UE 100A.

The eNB 200 may notify the information indicating that a serving cell (serving frequency) is a cell (frequency) which recommends P2V communication (transmission). The eNB 200 may notify (transmit) the P-UE 100A of the information by broadcast signaling (for example, SIB). The eNB 200 may notify (transmit) the information along with the information of the resource pool.

The P-UE 100A may determine whether to perform the following operation based on the information. The P-UE 100A may perform the following operation only when the serving cell is a cell which recommends the P2V communication. The P-UE 100A may omit the following operation when the serving cell is not a cell which recommends the P2V communication.

In step S120, the P-UE 100A may check the type of resource pools received from the eNB 200.

In step S130, the P-UE 100A may determine whether the resource pool is available in response to the type of resource pools.

The P-UE 100A may determine that the resource pool is available in response to the fact that the resource pool provided by the eNB 200 is the first resource pool (to be sensed). The P-UE 100A may determine that the resource pool is available in response to the fact that the resource pool provided by the eNB 200 is the second resource pool (not to be sensed).

The P-UE 100A may determine whether the resource pool is available in response to the type of resource pools and the capability of the P-UE 100A.

When the (type of) resource pool is the first resource pool, the P-UE 100A determines that the resource pool is unavailable in response to the fact that the P-UE 100A does not have the reception capability in the terminal-to-terminal communication (P2V communication). The P-UE 100A may determine that the resource pool is available in response to the fact that the P-UE 100A has the reception capability in the terminal-to-terminal communication.

When the (type of) resource pool is the second resource pool, the P-UE 100A determines that the resource pool is available in response to the fact that the P-UE 100A does not have the reception capability in the terminal-to-terminal communication (P2V communication). The P-UE 100A may determine that the resource pool is unavailable in response to the fact that the P-UE 100A has the reception capability in the terminal-to-terminal communication.

The eNB 200 may notify the P-UE 100A that the P-UE 100 which can use the second resource pool is only the P-UE 100 which does not have the reception capability in the terminal-to-terminal communication (P2V communication). The eNB 200 may notify (transmit) the P-UE 100A of the information by the broadcast signaling (for example, SIB).

The P-UE 100A may determine whether the resource pool is available based on the information.

The P-UE 100A may execute processing of step S140 according to the determination that the resource pool is available. The P-UE 100A may execute processing of step S150 according to the determination that the resource pool is unavailable.

In step S140, the P-UE 100A can perform the P2V transmission using the available resource pool. For example, when using the first resource pool, the P-UE 100A selects the unused radio resources from the first resource pool based on the sensing result. The P-UE 100A transmits the direct radio signal by the P2V communication using the selected radio resource. The V-UE 100B monitors the radio signal in the resource pool provided from the eNB 200. Thereby, the V-UE 100B receives the radio signal from the P-UE 100A. The V-UE 100B may perform control related to movement based on the radio signal from the P-UE 100A.

When using the second resource pool, the P-UE 100A may randomly select the radio resource from the second resource pool. Other operations are similar to the case where the first resource pool is used.

As described above, the P-UE 100A autonomously selects the radio resource when the resource pool is available. The P-UE 100A can transmit the direct radio signal by the P2V communication using the selected radio resource (Mode 4 transmission).

In step S150, the P-UE 100A may start control to transition from the RRC idle state to the RRC connected state in order to request the eNB 200 (network) for the radio resource for terminal-to-terminal communication. That is, the P-UE 100A may transmit the RRC connection request to the eNB 200. Thereafter, the P-UE 100A transitions to the RRC connected state. That is, the P-UE 100A establishes the RRC connection to the eNB 200 (cell (primary cell/serving cell)). The operation of the P-UE 100A in the RRC connected state will be described later.

The P-UE 100A may transition from the RRC idle state to the RRC connected state according to the determination that the resource pool is unavailable. The P-UE 100A may transition from the RRC idle state to the RRC connected state according to the fact that the resource pool for the terminal-to-terminal (P2V communication) is not provided. That is, the P-UE 100A may transition from the RRC idle state to the RRC connected state when the P2V communication cannot be performed in the RRC idle state.

Thereby, the P-UE 100A may determine whether or not to perform the Mode 4 transmission, according to whether or not the resource pool for the terminal-to-terminal communication (P2V communication) is provided.

(b) Operation in RRC Connected State

Next, the RRC connected state will be described with reference to FIG. 7. In the initial state, the P-UE 100A is in the RRC connected state. The P-UE 100A establishes the RRC connection to the eNB 200 (cell).

The P-UE 100A may perform the following operation after performing the above-described operation in the idle state. The P-UE 100A may perform the following operation regardless of whether the P-UE 100A performs the above-described operation in the idle state.

In step S210, the P-UE 100A may transmit, to the eNB 200, the information (Sidelink Rx Capability) indicating whether or not to have the reception capability in the terminal-to-terminal communication.

The P-UE 100A may transmit, to eNB 200, the information ("P-UE" indication) indicating whether or not the P-UE 100A has the pedestrian type function (whether the P-UE 100A is a P-UE). The P-UE 100A may transmit the "P-UE" indication to the eNB 200 along with the Sidelink Rx Capability. The P-UE 100A may transmit the "P-UE" indication to the eNB 200 only when having the pedestrian type function. The P-UE 100A may transmit, to the eNB 200, the "P-UE" indication indicating that the P-UE 100A does not have the pedestrian type function only when not having the pedestrian type function. The P-UE 100A may transmit, to the eNB 200, the "P-UE" indication as the capability of the P-UE 100A. As described above, the P-UE 100A may transmit the "P-UE" indication to the eNB 200 in advance, regardless of whether or not to perform the terminal-to-terminal communication (P2V communication).

The eNB 200 can determine whether or not the P-UE 100A has the reception capability in the terminal-to-terminal communication based on the Sidelink Rx Capability. The eNB 200 can determine whether the P-UE 100A has the pedestrian type function (that is, whether or not the P-UE 100A is a pedestrian UE) by the "P-UE" indication.

In step S220, it is assumed that data (side link data) for the terminal-to-terminal communication available for transmission are generated in the P-UE 100A. In the P-UE 100A, data to be transmitted may be generated by the P2V communication.

In step S230, the P-UE 100A transmits, to the eNB 200, a message for requesting the radio resource for the terminal-to-terminal communication. The P-UE 100A may include, in the message, the information indicating the amount of data to be transmitted. The P-UE 100A may include "P-UE" indication in the message.

In step S240, the eNB 200 may receive information for grasping the "P-UE" indication from an upper network apparatus. For example, the eNB 200 may receive, from an HSS 500, a UE context including the "P-UE" indication via an MME 300. The eNB 200 may determine whether the P-UE 100A has the pedestrian type function based on the UE context.

The eNB 200 may transmit, to the MME 300 (or the HSS 500), a message for requesting the "P-UE" indication. The MME 300 (or the HSS 500) may transmit the "P-UE" indication (UE context) to the eNB 200 in response to the reception of the message.

In step S250, the eNB 200 allocates the radio resource to the P-UE 100A. The eNB 200 allocates the radio resource (resource pool) allocated to the P-UE 100A from radio resources (resource pools) from the radio resource (resource pool) for the P-UE, according to the fact that the P-UE 100A has the pedestrian type function.

When it is determined that the P-UE 100A has the pedestrian type function, the eNB 200 can allocate the radio resource (resource pool) according to the capability of the P-UE 100A.

The eNB 200 may allocate the first resource pool to the P-UE 100A (only) when the P-UE 100A has the reception capability in the terminal-to-terminal communication. The eNB 200 may allocate the second resource pool to the P-UE 100A when the P-UE 100A has the reception capability in the terminal-to-terminal communication.

The eNB 200 may allocate the second resource pool to the P-UE 100A when the P-UE 100A does not have the reception capability in the terminal-to-terminal communication. The eNB 200 may not allocate the first resource pool to the P-UE 100A when the P-UE 100A does not have the reception capability in the terminal-to-terminal communication. Note that the eNB 200 may allocate the second resource pool only to the P-UE 100 that does not have the reception capability in the terminal-to-terminal communication.

When the eNB 200 does not permit the terminal-to-terminal communication (Mode 4 transmission) using the resource pool, the eNB 200 may allocate a time and frequency resource to the P-UE 100A. Even when the eNB 200 permits the terminal-to-terminal communication (Mode 4 transmission) using the resource pool, the eNB 200 may allocate the time and frequency resource to the P-UE 100A.

The P-UE 100A receives the radio resource (resource pool) allocated from the eNB 200.

In step S260, the P-UE 100A performs the transmission by the terminal-to-terminal communication using the allocated radio resources (resource pool).

When the time and frequency resource is allocated instead of the resource pool, the P-UE 100A performs the transmission by the terminal-to-terminal communication using the resource (Mode 3 transmission). That is, the P-UE 100A performs the transmission by the terminal-to-terminal communication under the control of the eNB 200.

When the allocated radio resource is in the resource pool, the V-UE 100B can receive the direct radio signal from the P-UE 100A by performing the monitoring in the resource pool.

The eNB 200 may notify the V-UE 100 of the allocated radio resource by broadcast or unicast. The V-UE 100 can receive a direct radio signal from the P-UE 100A by executing the monitoring in the notified radio resource.

When the resource pool is allocated, P-UE 100A performs the Mode 4 transmission as in the operation in the RRC idle. Specifically, the P-UE 100A selects the unused radio resources from the allocated resource pool. The P-UE 100A transmits the direct radio signal by the P2V communication using the selected radio resource. The V-UE 100B monitors the radio signal in the resource pool provided from the eNB 200. Thereby, the V-UE 100B receives the radio signal from the P-UE 100A.

Therefore, since the P-UE 100A can appropriately grasp the radio resources available to itself, the P-UE 100A can appropriately execute the P2V communication.

(B) Operation Example 2

Figure 8:
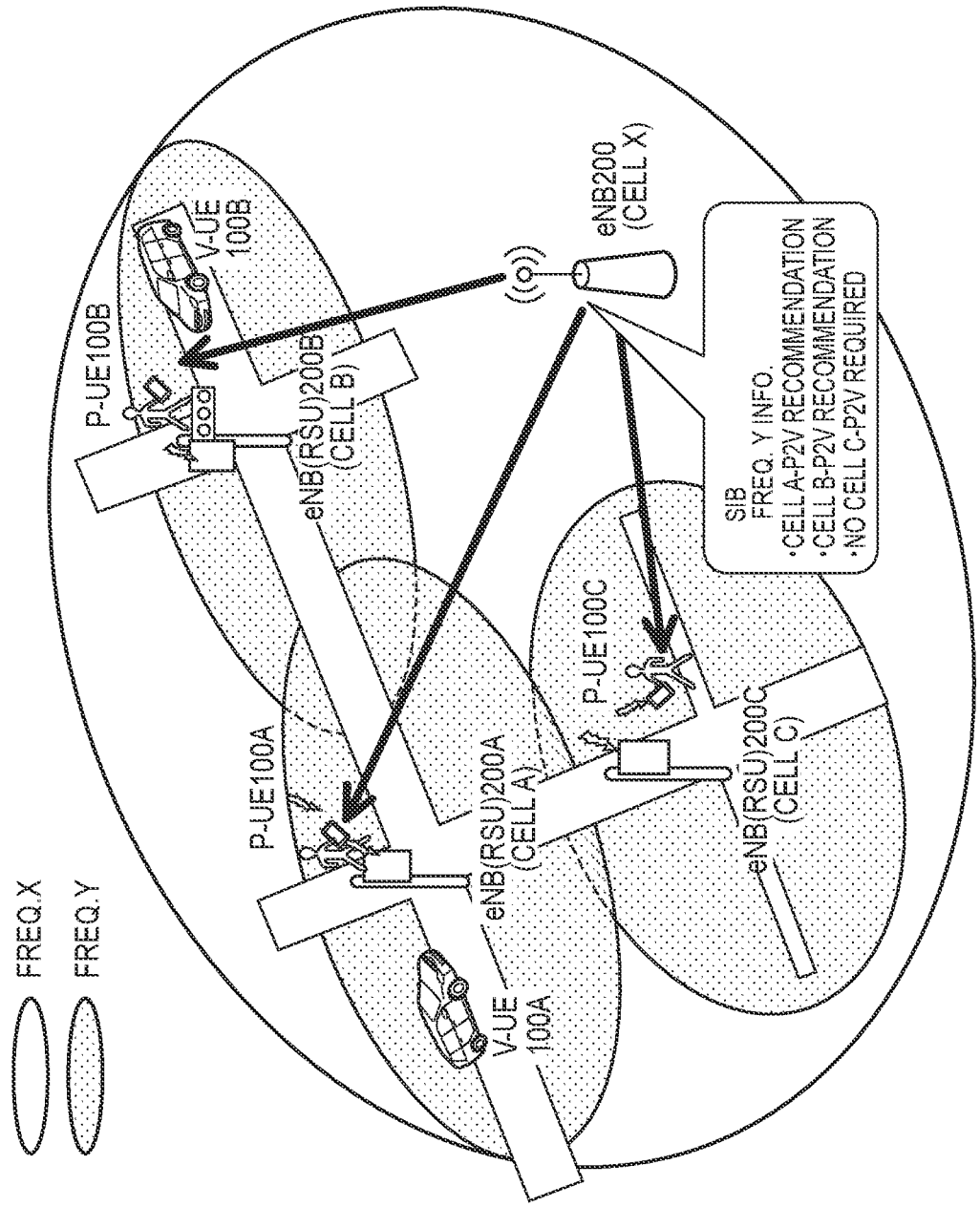
FIG. 8 is a diagram (part 1) for describing Operation Example 2.
Figure 9:
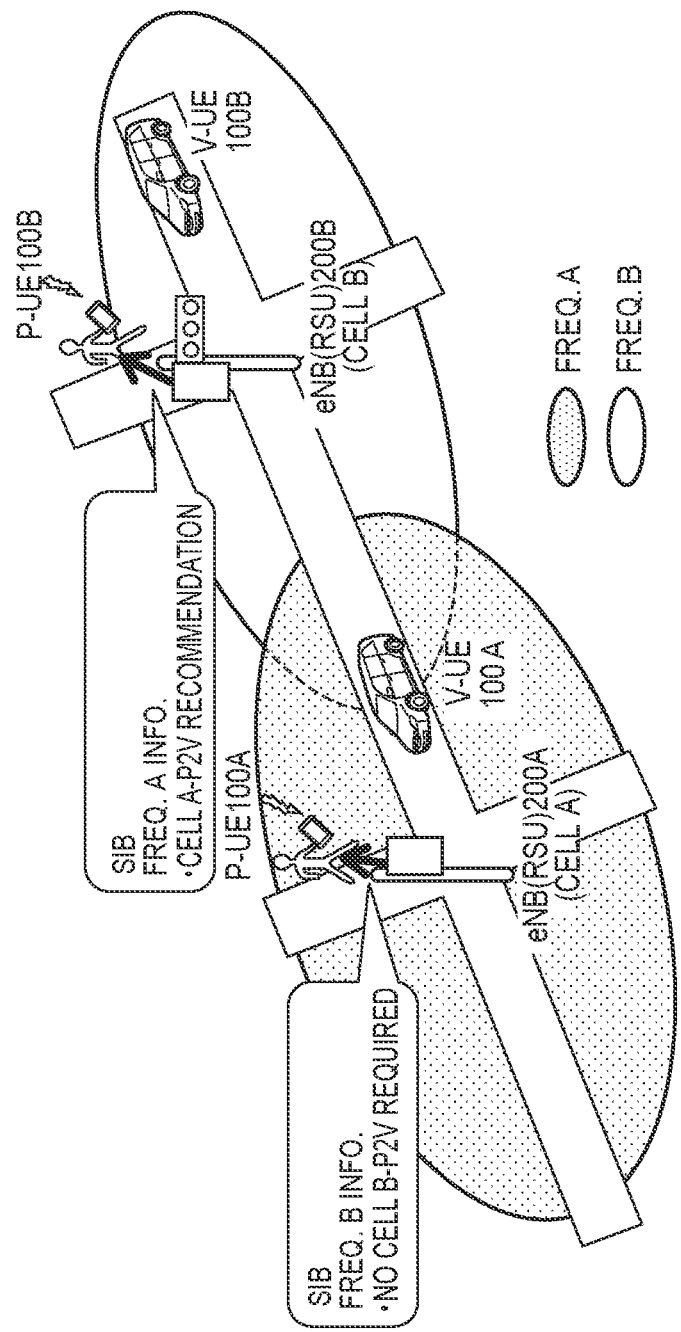
FIG. 9 is a diagram (part 2) for describing Operation Example 2.

The Operation Example 2 will be described with reference to FIGS. 8 and 9. FIG. 8 is a sequence diagram (part 1) for describing Operation Example 2. FIG. 9 is a sequence diagram (part 2) for describing Operation Example 2.

In FIG. 8, each P-UE 100 (P-UE 100A, P-UE 100B, and P-UE 100C) is connected to or camped on a cell X managed by an eNB 200. The cell X is a cell for cellular communication. The cell X belongs to frequency X for the cellular communication.

The eNB 200A manages a cell A belonging to a frequency Y. An eNB 200B manages a cell B belonging to the frequency Y. An eNB 200C manages a cell C belonging to the frequency Y. The cell A, the cell B, and the cell C are cells for V2X communication. The cell A, the cell B, and the cell C at least partially overlap with the cell X. The frequency Y is a frequency for the V2X communication. The frequency Y is different from the frequency X. The eNB 200A, the eNB 200B, and the eNB 200C may be road side units (RSUs).

The eNB 200 can notify each P-UE 100 of information (recommended information) indicating at least one of a cell and a frequency at which P2V transmission is recommended. The eNB 200 may notify (transmit) the P-UE 100A of the recommendation information by individual signaling (for example, RRC reconfiguration message, DCI, and the like) and/or broadcast signaling (for example, SIB).

The eNB 200 can notify each P-UE 100 of the recommended information indicating whether the cell (frequency Y) for the V2X communication is a recommended cell (frequency). For example, the eNB 200 can notify each P-UE 100 of the recommended information indicating that the P2V transmission is recommended in the cell A and the cell B and that the P2V communication is not recommended in the cell C. As an example, the P2V transmission may be recommended in the cell managed by the eNB (RSU) 200A and 200B configured in a location where a traffic volume of a vehicle is large. The P2V transmission may be recommended in a cell managed by the eNB (RSU) 200C configured in a location where the traffic volume of the vehicle is small.

The P-UE 100A may determine, based on the recommended information, that the P2V transmission is performed in the cell A (frequency Y). In this case, the P-UE 100A may perform the operation of Operation Example 1 described above. The P-UE 100A may perform the P2V transmission, for example, using the resource pool provided by the eNB (RSU) 200A. Thus, the recommended information may be a trigger for the P2V transmission. The eNB (RSU) 200A and the V-UE 100A performing the V2X communication can receive the P2V transmissions from the P-UE 100A by monitoring the resource pool of the same frequency. The same goes for the P-UE 100B. On the other hand, the P-UE 100C may determine, based on the recommended information, that the P2V transmission is not performed in the cell C (frequency Y).

As illustrated in FIG. 9, the eNB (RSU) 200 may notify the P-UE 100 of the recommended information in neighboring cells for the V2X communication.

For example, the eNB (RSU) 200B notifies the P-UE 100A (and P-UE 100B) of the recommended information indicating that the P2V transmission is recommended in the cell A (frequency A). Thereby, before entering the cell A, the P-UE 100A can know that the P2V transmission is recommended in the cell A. The recommended information in the cell A notified by the eNB (RSU) 200B may include information of the resource pool used for the P2V transmission in the cell A. Thereby, the P-UE 100A can perform the P2V transmission immediately after entering the cell A. In addition, the V-UE 100A can receive the P2V transmission immediately after entering the cell A.

The frequency A managed by the eNB (RSU) 200A and the frequency B managed by the eNB (RSU) 200B may be the same. The frequency A and the frequency B may be different from each other.

(C) Operation Example 3

Operation Example 3 will be described. The description overlapping with each of the above operation examples will be omitted.

In Operation Examples 1 and 2, the available conditions of the resource pool relate to the sensing. In Operation Example 3, an available condition of a resource pool relates to acquisition of location information.

(a) Operation Pattern 1

Figure 10:
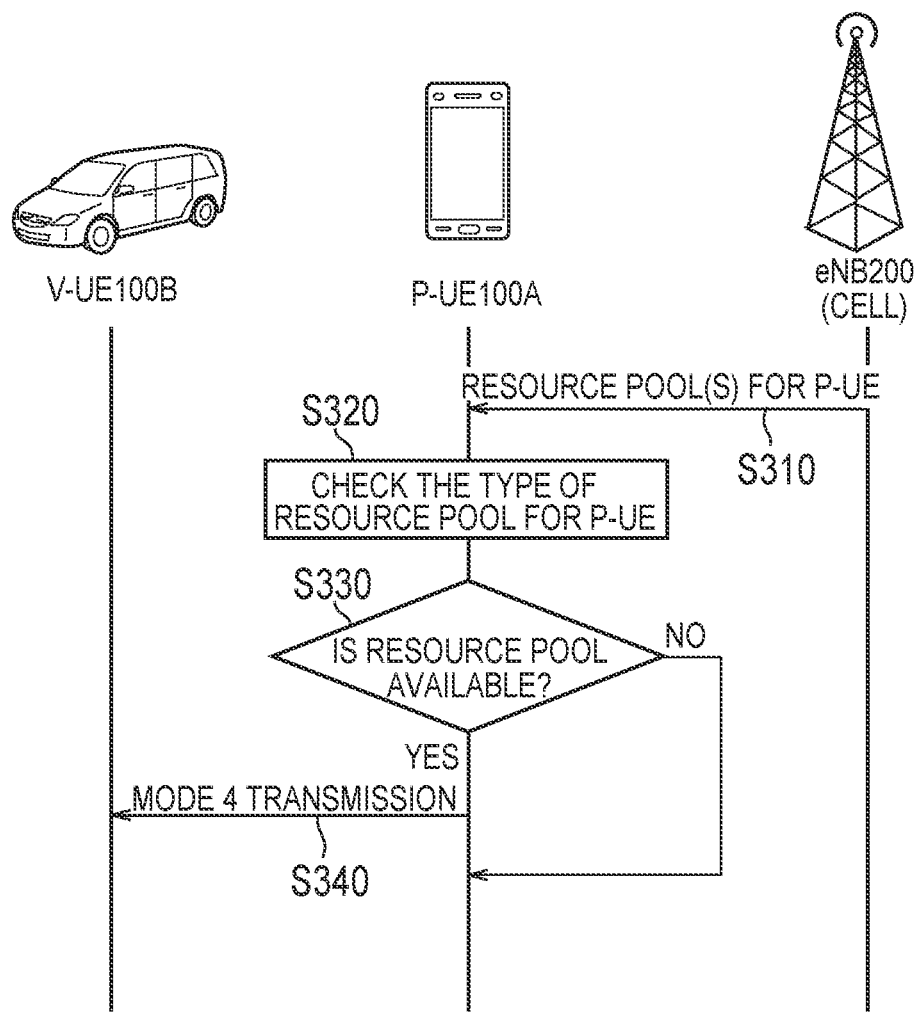
FIG. 10 is a sequence diagram for describing Operation Example 3 (operation pattern 1).
Figure 11:
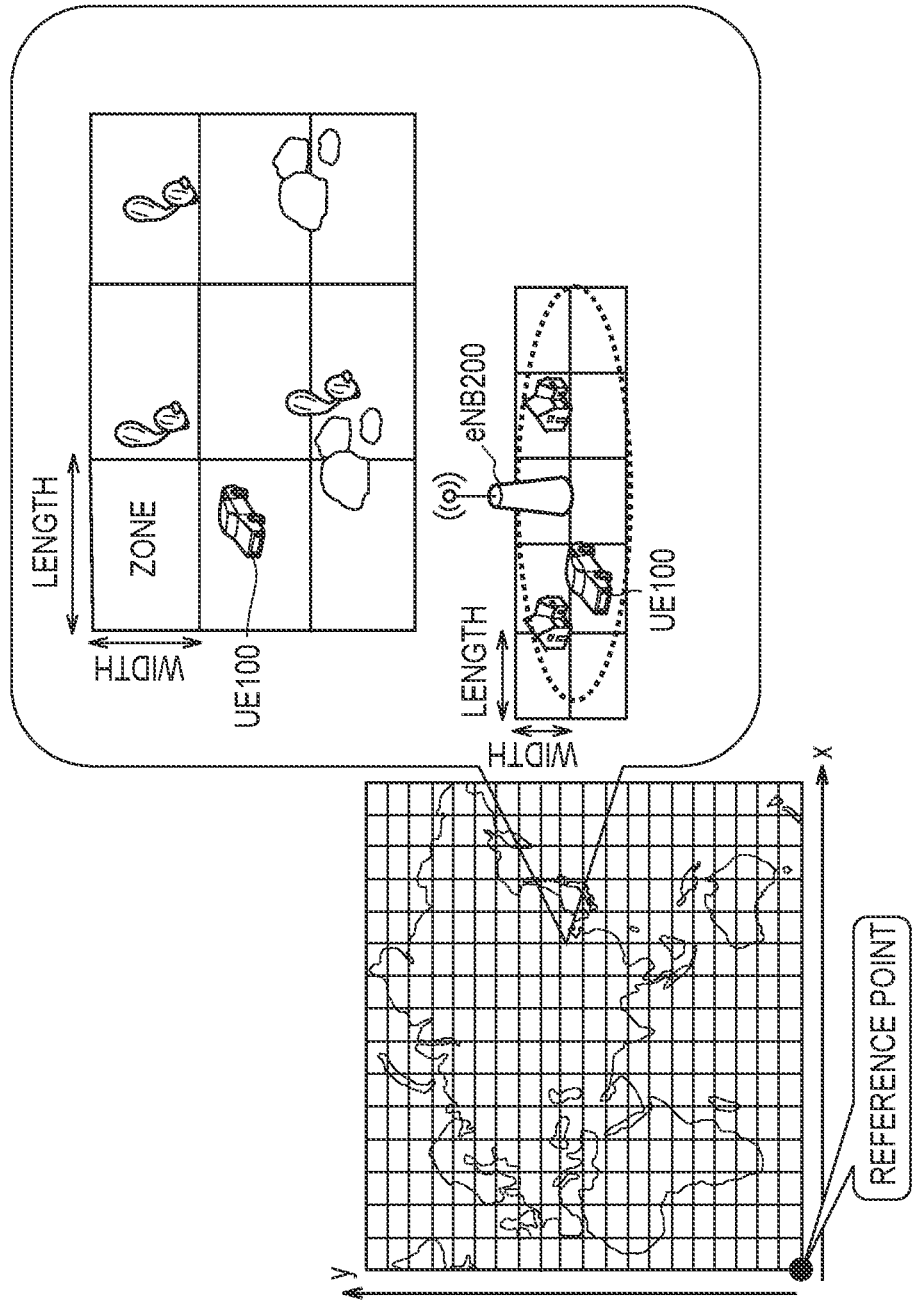
FIG. 11 is a diagram for describing an example of a zone.

Operation pattern 1 will be described with reference to FIGS. 10 and 11. FIG. 10 is a sequence diagram for describing Operation Example 3 (operation pattern 1). FIG. 11 is a diagram for describing an example of a zone.

In FIG. 10, a P-UE 100A is in an RRC idle state. The P-UE 100A may be in an RRC connected state. The P-UE 100A exists in a cell managed by an eNB 200.

In step S310, the eNB 200 may transmit information (resource pool(s) for P-UE) on a resource pool to the P-UE 100A. The P-UE 100A receives, from the eNB 200, the information of the resource pool transmitted toward the P-UE 100A.

The eNB 200 may transmit the information of the resource pool to the P-UE 100A by broadcast signaling (for example, system information block (SIB)). The eNB 200 may transmit the information of the resource pool to the P-UE 100A by individual signaling (for example, RRC reconnection message).

The information of the resource pool indicates a plurality of resource pools. The information of the resource pool may indicate at least one of the following third resource pool and fourth resource pool.

The third resource pool is a resource pool available to (only) P-UE which can acquire its own geo-location information. The third resource pool may be a resource pool associated with a geographical area where the resource pool is available. The geographical area may be a zone. The zone is a geographical area defined by a zone concept.

As illustrated in FIG. 11, in the zone concept, the world is divided into geographical zones. The UE (P-UE) 100 which is in coverage may receive information (zone definition information) for defining a zone (zone identification information) from the eNB 200. Pre-configured information (zone definition information) is applied to the UE 100 which is out of coverage. The zone definition information defines, for example, a length of the zone, a width of the zone, and a single fixed reference point.

The UE 100 determines the zone in which the UE 100 is located based on the zone definition information. That is, the UE 100 determines which zone the UE 100 is located in. The UE 100 can determine the zone by modulo operation. The UE 100 can determine the zone using a reference point (for example, (0,0)).

The zone is different from cell coverage. The cell corresponds to a coverage of a radio signal of the eNB 200. The zone is, for example, a geographical section determined (defined) by a network (eNB 200 and the like).

The fourth resource pool is a resource pool available to (only) P-UE which cannot acquire its own geo-location information. The fourth resource pool may be a resource pool which is not associated with a geographical area where the resource pool can be used. The fourth resource pool may be a resource pool which is available regardless of the location of the P-UE 100. The fourth resource pool may be an exceptional resource pool for V2V communication. That is, a radio resource used for P2V communication may be the same as the exceptional radio resource used for the V2V communication.

The P-UE 100 which cannot acquire its own geo-location information may be, for example, a UE which does not have a location information acquisition function (acquisition capability) (for example, GNSS reception function/GNSS receiver, and the like). The P-UE 100 which cannot acquire its own geo-location information may be a UE which has a location information acquisition function but cannot actually acquire location information. For example, the P-UE 100 in which the location information acquisition function is valid (deactivated (off)) may be the P-UE 100 which cannot acquire its own geo-location information. The P-UE 100 which cannot receive the radio signal (for example, a GNSS signal) carrying the location information (reception level is lower than a threshold) due to the radio environment of the P-UE 100 may be the P-UE 100 which cannot acquire its own geo-location information.

The time and frequency resource (third resource) configuring the third resource pool may be different from the time and frequency resource (fourth resource) configuring the fourth resource pool. That is, the third resource and the fourth resource may be arranged at different locations in the time direction and/or the frequency direction. As a result, it is possible to suppress deterioration in reception quality due to "near-far problem" and/or "in-band emission".

The eNB 200 may transmit identification information for identifying the type of resource pools to the P-UE 100A. The eNB 200 may transmit the identification information to the P-UE 100A along with the information of the resource pool. The P-UE 100A may receive the identification information from the eNB 200.

The identification information may be associated with (the information of) the resource pool. The identification information may indicate that the associated resource pool is, for example, the third resource pool, that is, a resource pool to which (only) the P-UE capable of acquiring its own geo-location information is available.

The identification information may indicate that the associated resource pool is, for example, the fourth resource pool, that is, a resource pool to which (only) the P-UE capable of acquiring its own geo-location information is available.

The identification information may indicate that the associated resource pool is the exceptional resource pool for the V2V communication.

The identification information may be zone identification information. In this case, the P-UE 100 may determine that the resource pool associated with the zone identification information is, for example, the third resource pool. The zone identification information may be an identifier (zone ID) indicating a predetermined zone (for example, zone 1). The zone identification information may be information (formula, parameters, and the like) for specifying (calculating) a predetermined zone.

In step S320, the P-UE 100A may check the type of resource pools received from the eNB 200. The P-UE 100A may check the type of resource pools based on the identification information.

In step S330, the P-UE 100A may determine whether the resource pool is available in response to the type of resource pools. The P-UE 100A may determine whether the resource pool is available according to the conditions other than the type of resource pools. The P-UE 100A may determine, for example, whether the resource pool is available according to whether the location information of the P-UE 100A can be acquired. The P-UE 100A may determine, for example, based on the capability of the P-UE 100A, whether the location information of the P-UE 100A can be acquired. Accordingly, the P-UE 100A may determine whether the resource pool is available in response to the type of resource pools and the capability of the P-UE 100A.

The P-UE 100A may determine that the third resource pool is available according to the fact that the P-UE 100A can acquire the location information of the P-UE 100A. The P-UE 100A may determine that the third resource pool is available according to the fact that the P-UE 100A cannot acquire the location information of the P-UE 100A.

The P-UE 100A may determine that the third resource pool is available according to the fact that the P-UE 100A has the location information acquisition function. The P-UE 100A may determine that the third resource pool is unavailable according to the fact that the P-UE 100A does not have the location information acquisition function. The capability of the P-UE 100A may be the location information acquisition function.

The P-UE 100A may determine that the third resource pool is available according to the fact that the P-UE 100A actually receives (acquires) the location information of the P-UE 100A. The P-UE 100A may determine that the third resource pool is unavailable according to the fact that the P-UE 100A cannot actually receive (acquire) the location information of the P-UE 100A.

The P-UE 100A may determine that the fourth resource pool is available according to the fact that the P-UE 100A cannot acquire the location information of the P-UE 100A. The P-UE 100A may determine that the fourth resource pool is available according to the fact that the P-UE 100A can acquire the location information of the P-UE 100A.

The P-UE 100A may determine that the fourth resource pool is available according to the fact that the P-UE 100A does not have the location information acquisition function. The P-UE 100A may determine that the fourth resource pool is unavailable according to the fact that the P-UE 100A has the location information acquisition function.

The P-UE 100A may determine that the fourth resource pool is available according to the fact that the P-UE 100A cannot actually receive (acquire) the location information of the P-UE 100A. The P-UE 100A may determine that the fourth resource pool is unavailable according to the fact that the P-UE 100A actually receives (acquires) the location information of the P-UE 100A.

The P-UE 100A may perform processing of step S340 according to the determination that the resource pool is available.

In step S340, the P-UE 100A can perform the P2V transmission using the available resource pool. For example, when using the third resource pool, the P-UE 100A selects the radio resource corresponding to the location information from the third resource pool based on the location information of the P-UE 100A. The P-UE 100A may select the third resource pool corresponding to the location information when each of the plurality of third resource pools is associated with the available area. The UE 100 may select the radio resource from the selected third resource pool. The P-UE 100A transmits the direct radio signal by the P2V communication using the selected radio resource.

The P-UE 100A may request the eNB 200 for the radio resource (resource pool) for the P2V transmission according to the determination that the resource pool notified in step S310 is unavailable. The P-UE 100A may include, in the message for the request, the information indicating whether the location information of the P-UE 100A can be acquired. The eNB 200 may individually notify the P-UE 100 of the third resource pool or the fourth resource pool according to whether the P-UE 100 can acquire its own location information.

The P-UE 100A may use another resource pool notified from the eNB 200 according to the determination that the resource pool notified in step S310 is unavailable.

For example, the P-UE 100A which cannot acquire the location information (for example, the location information acquisition function is off) may perform the P2V communication using the fourth resource pool which is notified by broadcast separately from step S310 without using the third resource pool individually notified in step S310.

As described above, since the P-UE 100A can appropriately perform the P2V communication since the P-UE 100A can appropriately grasp its own available radio resources according to whether the P-UE 100A can acquire its own location information.

(b) Operation Pattern 2

Operation pattern 2 will be described with reference to FIG. 12. FIG. 12 is a sequence diagram for describing Operation Example 3 (operation pattern 2). The same parts as those described above content will be omitted.

As illustrated in FIG. 12, in step S410, the P-UE 100A determines whether the P-UE 100A can acquire its own location information. The P-UE 100A may determine whether the P-UE 100A can actually receive (acquire) the location information. For example, the P-UE 100A may determine whether the location information acquisition function is invalid (deactivate (off)) or valid (active (on)). Even when the P-UE 100A has the location information acquisition function, the P-UE 100A may determine that the P-UE 100A cannot acquire its own location information when the location information acquisition function is invalid.

In step S420, the P-UE 100A transmits, to the eNB 200, the information (location acquisition information) indicating whether the P-EU 100A can acquire its own location information. The P-UE 100A may transmit the location acquisition information to eNB 200 after transitioning to the RRC connected state when being in the RRC idle state. The P-UE 100A may transmit the location acquisition information to the eNB 200 before individually receiving the information of the resource pool from the eNB 200. The P-UE 100A may transmit the location acquisition information to the eNB 200 before individually configuring the information of the resource pool from the eNB 200. P-UE 100A may transmit the location acquisition information to the eNB 200 by a SidelinkUEInformation message. The P-UE 100A may transmit the location acquisition information to the eNB 200 by a MAC control element (MAC CE). The P-UE 100A may transmit the location acquisition information to the eNB 200 by a UE capability message.

The location acquisition information may indicate at least one of the following (a) to (d).

(a) Whether the P-UE 100A has the location information acquisition function (acquisition capability)

(b) Whether the location information acquisition function is valid (active (on)) or invalid (deactivate (off))

(c) Whether the location information signal (for example, a GSNN signal or a GPS signal) is normally received (d) Whether the P-UE 100A can specify its own location The P-UE 100A may transmit, to the eNB 200, the location acquisition information indicating whether the location information acquisition function is valid or invalid when having the location information acquisition function.

The P-UE 100A may transmit, to the eNB 200, the location acquisition information indicating whether the P-UE 100A normally receives the location information signal (or the P-UE 100A can specify its own location) when the P-UE 100A has the location information acquisition function and the location information acquisition function is valid.

In step S430, the P-UE 100A may request the eNB 200 for the radio resource (resource pool) for the P2V transmission. The P-UE 100A may include the location acquisition information in the message for the request. The P-UE 100A may use the SidelinkUEInformation message as the message for the request. The P-UE 100A may perform processing of step S420 and processing of step S430 simultaneously.

Step S430 may be omitted. For example, the eNB 200 may notify the P-UE 100A of the resource pool in response to the reception of the location acquisition information. The eNB 200 may configure the resource pool for the P-UE 100A without the request from the P-UE 100A.

In step S440, the eNB 200 individually transmits the information of the resource pool to the P-UE 100A. Thereby, the eNB 200 may configure the resource pool in the P-UE 100A.

The eNB 200 may determine the resource pool configured in the P-UE 100A according to whether the P-UE 100A can acquire its own location information.

The eNB 200 may individually transmit information of a third resource pool to the P-UE 100A when the P-UE 100A can acquire its own location information. The eNB 200 may individually transmit information of a fourth resource pool to the P-UE 100A when the P-UE 100A cannot acquire its own location information.

Even when the P-UE 100A cannot obtain its own location information, the eNB 200 may individually transmit the information of the third resource pool to the P-UE 100A when the P-UE 100A has the location information acquisition function. In this case, the eNB 200 may transmit information of the third resource pool to the P-UE 100A in order to instruct the P-UE 100A to acquire the location information. The eNB 200 may transmit explicit indication to the P-UE 100A in order to request the acquisition of the location information. The eNB 200 may individually transmit the indication to the P-UE 100A along with the information of the third resource pool.

The P-UE 100A may start the operation for acquiring the location information in response to the indication from the eNB 200. The P-UE 100A may start the operation for acquiring the location information when the P-UE 100A receives the information of the third resource pool from the eNB 200 regardless of the fact that the P-UE 100A transmits, to the eNB 200, the location acquisition information that the P-UE 100A cannot acquire its own location information. For example, the P-UE 100A may make the location information acquisition function valid. In order to obtain the permission from the user, the P-UE 100A may display, on a display, information indicating an inquiry as to whether to effectively change the acquisition function of the location information.

The eNB 200 may individually transmit the indication to the P-UE 100A along with the information of the fourth resource pool. The fourth resource pool may be available until the P-UE 100A acquires the location information. The fourth resource pool may be an exceptional resource pool. The fourth resource pool may be unavailable after the P-UE 100A acquires the location information.

The eNB 200 may individually transmit the information of the fourth resource pool to the P-UE 100A along with the information of the third resource pool when the P-UE 100A has the location information acquisition function. The P-UE 100A may use the fourth resource pool for the P2V communication until the P-UE 100A acquires the location information. The P-UE 100A may use the fourth resource pool until the P-UE 100A acquires the location information. After acquiring the location information, the P-UE 100A may use only the third resource pool without using the fourth resource pool.

In step S450, the P-UE 100A may perform the P2V communication based on the resource pool information received from the eNB 200. The P-UE 100A may configure the resource pool based on the information of the resource pool received from the eNB 200. The P-UE 100A may perform the P2V communication using the configured resource pool.

As described above, the P-UE 100A may transmit the location acquisition information to the eNB 200 before receiving the information of the resource pool from the eNB 200. Thereby, the eNB 200 can appropriately determine the resource pool to be configured for P-UE 100A according to the location acquisition information. As a result, the P-UE 100A can appropriately perform the P2V communication.

The P-UE 100A may switch the resource pool to be used according to whether the P-UE 100A can actually acquire its own geo-location information.

For example, when the information of the resource pool received from the eNB 200 indicates the third resource pool, the P-UE 100A stops using the third resource pool according to the switching of the location information acquisition function from the valid state to the invalid state. In this case, the P-UE 100A may perform the P2V communication using, for example, the fourth resource pool notified by broadcast. The P-UE 100A may resume the use of the third resource pool according to the switching of the location information acquisition function from the valid state to the invalid state.

The P-UE 100A may (again) perform the processing of step S420 and/or step S430 according to the switching of the location information acquisition function. Specifically, the P-UE 100A may (again) perform the processing of step S420 and/or step S430 according to the switching of the location information acquisition function from the valid state to the invalid state. The P-UE 100A may (again) perform the processing of step S420 and/or step S430 according to the switching of the location information acquisition function from the invalid state to the valid state.

Similarly, the P-UE 100A may (again) perform the processing of step S420 and/or step S430 according to the switching of whether the location information signal is normally received. The P-UE 100A may (again) perform the processing of step S420 and/or step S430 according to the switching of whether the P-UE 100A can specify its own location.

The eNB 200 may configure, for the UE 100, a timer that prohibits the P-UE 100A from repeatedly transmitting location acquisition information in a fixed period. For example, in order to configure the timer, the eNB 200 may transmit information on the timer to the UE 100 when the P-UE 100A transitions from the RRC idle state to the RRC connected state. The eNB 200 may transmit the information on the timer to the UE 100 together with the information of the resource pool in step S440.

The P-UE 100A may start the timer in response to the transmission of the location acquisition information. Even if the P-UE 100A updates the location acquisition information while the timer operates (that is, until the configured timer expires after the location acquisition information is transmitted), the transmission of the location acquisition information may be omitted.

The P-UE 100A may perform the P2V communication by continuously using the third or fourth resource pool configured by the resource pool information received in step S440 even if the location acquisition information is updated while the timer operates.

When the location acquisition information is updated while the timer operates, the P-UE 100A may perform the P2V communication using the exceptional resource pool (fourth resource pool) without using the resource pool (third or fourth resource pool) used before the location acquisition information is updated. The exceptional resource pool may be included in the information of the resource pool received in step S440. The exceptional resource pool may be included in the resource pool information received at timing other than step S440. The exceptional resource pool may be preconfigured in the P-UE 100A.

The P-UE 100A may transmit the location acquisition information to the eNB 200 after the timer expires. The P-UE 100A may transmit the location acquisition information to eNB 200 according to the expiration of the timer, when the location acquisition information is updated before the timer expires. The P-UE 100A may transmit the location acquisition information to the eNB 200 when the location acquisition information is updated after the timer expires.

By configuring the timer for the UE 100, the eNB 200 can suppress an increase in a signaling load due to frequent switching such as the location information acquisition function. The eNB 200 can appropriately acquire the location acquisition information from the P-UE 100A, and thus can appropriately determine the resource pool to be configured for the P-UE 100A.

Other Embodiments

Although the contents of the present application have been described by the above-described embodiments, it should not be understood that the statements and drawings that form a part of this disclosure limit the contents of the present application. Various alternative embodiments, embodiments, and operation techniques will be apparent to those skilled in the art from this disclosure.

In the above description, a P-UE 100A has been described focusing on terminal-to-terminal communication using side links, but is not limited thereto. The P-UE 100A may perform the above-described operation when directly transmitting/receiving a radio signal such as a Discovery signal (message) or PC5 signaling. The P-UE 100A may perform the above-described operation when directly transmitting/receiving the radio signal in a system other than the LTE system.

The P-UE 100A may perform P2V transmission (via Uu) via an eNB 200 when the P-UE 100A does not have transmission capability (for example, Sidelink Tx Capability) in the terminal-to-terminal communication.

The operations (operation examples) according to the above-described embodiments may be appropriately combined and performed. In each sequence described above, all operations are not necessarily required. For example, in each sequence, only some operations may be performed.

For example, the operation in Operation Example 3 may be performed in Operation Example 1. For example, in Operation Example 1, identification information for identifying the type of resource pools may be used. The identification information may indicate that the associated resource pool is the first resource pool. The identification information may indicate that the associated resource pool is the second resource pool.

Although not particularly stated in the each embodiment described above, there may be provided a program for causing a computer to perform each process that is to be performed by any one of the nodes (the UE 100, the eNB 200, etc.) described above. The program may be recorded in a computer-readable medium. The program may be installed in a computer by using the computer-readable medium. The computer-readable medium where the program is recorded may be a non-transitory recording medium. The non-transitory recording medium may be, but not limited to, recording media such as CD-ROMs and DVD-ROMs.

There may be provided a chip including a memory storing the program for executing each process that is to be performed by any one of the UE 100, or the eNB 200, and a processor for executing the program stored in the memory.

In the embodiments described above, an LTE system is described as an example of the mobile communication system, but the contents of the present application may be applied to systems other than the LTE system, without being limited to the LTE system. For example, the contents of the present application may be applied to a communication system operated in 5G.

APPENDIX A (A1) Introduction

The UE should use its own geographical information in order to acquire V2V resource allocation and geo-location information reporting and location-based resource allocation for mode 1 and an appropriate V2V transmission resource for mode 2 (zone concept).

In this appendix, the case where the geo-location information is not available in the UE is investigated.

(A2) Examination (A2.1) Lack of Geo-Location Information

The zone concept can achieve appropriate V2V transmission resource allocation based on the UE's geo-location information. Accordingly, the UE can avoid collision with another UE's V2V transmission resource and mitigate an influence of in-band emission. Considering this aspect, the resource allocation based on the geo-location information is efficient, but when the UE cannot obtain its own geo-location, for example, the behavior of the UE which is in a long tunnel that cannot access GNSS signals needs to be examined. When the UE cannot receive its own geo-location information, a current zone ID using the zone concept type cannot be determined by the UE and cannot select the appropriate V2V transmission resource. Accordingly, the UE which cannot obtain the geo-location information may perform the V2V transmission and may have no means of avoiding dangerous conditions. In order to avoid these conditions, it is necessary to specify some clarifications for the UE operation in order to enable the UE to transmit the V2V signal without the geo-location information.

View 1: When the geo-location information is not available, it is necessary to consider means for the UE to determine the appropriate V2V transmission resource.

(A2.1.1.) Exceptional Resource for Zone Concept

One of the methods for allowing an eNB to provide a V2V transmission resource to a UE without geo-location information is to introduce an exceptional resource for a zone concept. When the UE cannot acquire its own geo-location information and cannot determine the appropriate zone ID, the UE may use the exceptional resource for the V2V transmission. Since the zone concept can be applied to both out-of-coverage and in-coverage scenarios, it is also necessary to provide exceptional resources in both scenarios. Zone-related parameters may be different in the two scenarios, that is, a length and a width of the zone and the number of zones are different between the out-of-coverage and the in-coverage, the exceptional resource for the out-of-coverage scenario should be configured in similar zone related parameters in advance, and the exceptional resource for the in-coverage scenario should be provided from a serving cell along with its own zone related parameters.

Proposal 1: The exceptional resource for the zone concept should be introduced so that the UE without the geo-location information can continue to perform the V2V transmission.

Since RAN2 has issued a statement "introduce a new SIB for V2X", at least zone-related pool, that is, a location-specific resource is provided in a new SIB. Since the exceptional resource is not the location-specific resource, the UE without the geo-location information can reuse a legacy sidelink resource, that is, a resource provided in SIB 18 as the exceptional resources for the zone concept. However, considering characteristics of V2V traffic, RAN1 agrees that "SA pool and its associated data pool can be adapted for FDM", the advantage of the pool adapted for FDM is that "SA and data pool receive similar levels of in-band emission", "low-latency transmission can be serviced without increasing overhead", and "flexible design to enable mixing of periodic traffic and non-periodic traffic is achieved", such that the V2V resource pool in the new SIB may have new characteristics to handle the V2V traffic. It is worth considering whether the exceptional (SC/data) resource should have the same structure as a non-exceptional (SC/data) resource pool for V2V.

Proposal 2: Exceptional resource for zone concept should have the same structure as the non-exceptional (SC/data) resource pool for V2V.

(A2.1.2.) Switching to Mode 1 Transmission

Without the geo-location information, it is difficult for the serving cell to determine the appropriate V2V transmission resource to allocate to the UE without affecting the in-band emission. However, when the eNB can estimate the geo-location information of the UE via one of the location services (LCS), such as observed time difference of arrival (OTDOA), the eNB can provide the estimated geo-location information of the UE or the zone ID to the UE, and the UE can continue zone-based mode 2 transmission. Another method for providing a V2V transmission resource to a UE without geo-location information is to end mode 2 transmission based on a zone concept and start mode 1 transmission. In any case, when the UE cannot acquire its own geo-location information, it is useful for the UE to inform the eNB of this situation and the need for assistance from the eNB, regardless of which solution is used to allocate the appropriate resource pool.

In the in-coverage scenario, the UE without the geo-location information efficiently introduces the exceptional resource for the zone concept and performs the switching to the mode 1 transmission, so the best method for providing assistance to a UE lacking geo-location information depends on eNB implementation.

Proposal 3: Switching from zone-based mode 2 transmission to mode 1 transmission may be used for V2V transmission when the UE lacks its own geo-location information.

Proposal 4: A serving cell should provide either an exceptional resource for a zone concept or an indication to switch to mode 1 transmission for a UE lacking geo-location information.

APPENDIX B (B1) Introduction

In a resource pool configuration, whether a zone-based configuration is used for a P2V operation as well as a V2V operation is still an additional challenge. The influence occurring at the time of introducing the zone-based configuration for the P2V is examined.

(B2) Examination

In the V2V, the motivation for the zone-based configuration is to mitigate co-channel interference. When it is considered that the same goes for the P2V, in particular, when the eNB provides a resource for a pedestrian UE (P-UE) overlapping with that for a vehicle UE (V-UE), the situation gets worse. Accordingly, it is beneficial to support the zone configuration for the P2V operation.

Proposal 1: A zone configuration should be introduced into a P2V operation to mitigate co-channel interference.

However, considering the low cost UE without positioning capability due to, for example, a lack of a GPS/GNSS receiver, it is questionable whether the positioning information is available to all P-UEs. Even if the UE is positioned, depending on the location of the UE, for example, in a tunnel or when a user simply turns off its positioning function, it can be assumed that some UEs cannot receive a positioning signal (for example, a GPS signal). Therefore, it should be assumed that the zone-based configuration cannot be used properly, and such P-UE should not be forced to support the zone-based configuration.

Proposal 2: The P-UE should not be forced to support the zone-based configuration.

For the P-UE which cannot be positioned and the P-UE which can be positioned but whose positioning is off, it is unclear which resource pool should be provided. When the P-UE without positioning can use a resource pool overlapping with those associated with the zone-based configuration, co-channel interference occurs, which is a big problem in the zone-based resource pool, that is, at a V-UE. The P-UE without positioning can be configured in a dedicated resource pool, but the eNB needs to allocate a resource which does not overlap with the zone pool. Even if such non-overlapping resources are available, it is likely to increase complexity in NW in order to manage these resources and the signaling load associated with such configuration.

Another possible option is to use the exceptional resource for the V2V. The existing exceptional resource is not associated with the zone configuration, so the P-UE without positioning can use the exceptional resource. However, the existing exceptional resources are mainly used for V-UEs experiencing handover regions and radio link failure (RLF). Therefore, the eNB may not assume that the exceptional resource will be used for the P-UE anytime/anywhere/continuously. Therefore, it seems to be problematic for the P-UE without positioning to autonomously use the existing exceptional resource.

In view of the above problems, the eNB needs to manage the resource pool for the P-UE without positioning. Accordingly, it is useful for the eNB to indicate whether the P2V resource requires that the UE can acquire the location information.

This indication may be provided implicitly or explicitly, for example, the P-UE without positioning implicitly understands the permission because there is no zone configuration in each pool configuration, but the eNB may provide the explicit indication of permission to use the pool in the pool configuration.

Proposal 3: The eNB should indicate whether the P-UE needs the availability of the location information to use the P2V resource pool.

In addition, considering the case of the P-UE without positioning in the RRC connected state, the eNB needs to know the availability of the location information of the P-UE, for example, in order to have an option to allocate the dedicated resource to the P-UE without positioning, it is necessary to know whether the P-UE which can be positioned has the positioning. Therefore, the P-UE in the RRC connected state should be permitted to transmit the availability indication of the positioning to the eNB. The P-UE will report the availability indication when the availability of the positioning changes, but when the availability of the positioning changes frequently, for example, when the P-UE frequently turns on and off the positioning function (for example, GPS/GNSS), the signaling load will increase due to the frequent reporting of the availability indication. Thus, when the availability indication of the positioning are supported, it is worth configuring a prohibit timer in order for the P-UE to limit the frequent reporting of the availability indication.

Proposal 4: Proposal 4: The P-UE in the RRC connected state should be permitted to transmit the availability indication of the positioning to the eNB.

Proposal 5: When the proposal 4 is agreed, the eNB should have the option of configuring, in the UE, the prohibit timer to limit the frequent reporting of the availability indication.

The entire contents of U.S. Provisional Application No. 62/454,201 (filed Feb. 3, 2017) are incorporated herein by reference.

The invention claimed is:

1. A communication method, comprising the steps of:
   transmitting capability information from a pedestrian user equipment to a base station, the capability information indicating whether the pedestrian user equipment supports geographical zone based resource selection;
   receiving, by the base station, the capability information from the pedestrian user equipment;
   individually transmitting, from the base station to the pedestrian user equipment, information indicating a geographical zone based radio resource pool for direct terminal-to-terminal communication, when the capability information indicates that the pedestrian user equipment supports the geographical zone based resource selection, and the information further indicates a plurality of zone based radio resource pools; and
   selecting, by the pedestrian user equipment, a zone based radio resource pool from among the plurality of zone based radio resource pools according to a zone where the pedestrian user equipment exists.

2. The communication method according to claim 1, comprising the steps of:
   transmitting, from the pedestrian user equipment to the base station, a request message for requesting a radio resource pool for the direct terminal-to-terminal communication; and
   receiving, by the base station, the request message from the pedestrian user equipment, wherein
   in the step of transmitting the information, the information is individually transmitted from the base station to the pedestrian user equipment in response to the reception of the request message.

3. The communication method according to claim 1, wherein
   the capability information indicates whether the pedestrian user equipment supports the geographical zone based resource selection where the pedestrian user equipment selects a resource pool depending on a geographical zone in which the pedestrian user equipment locates.

4. The communication method according to claim 1, wherein
   the information includes an identifier of a geographical zone corresponding to the zone based radio resource pool.

5. The apparatus according to claim 1, wherein
   the capability information indicates whether the pedestrian user equipment supports the geographical zone based resource selection where the pedestrian user equipment selects a resource pool depending on a geographical zone in which the pedestrian user equipment locates.

6. A pedestrian user equipment, comprising:
   a transmitter; and
   a receiver, wherein
   the transmitter is configured to transmit capability information to a base station, the capability information indicating whether the pedestrian user equipment supports geographical zone based resource selection,
   the receiver is configured to individually receive, from the base station, information indicating a geographical zone based radio resource pool for direct terminal-to-terminal communication, when the capability information indicates that the pedestrian user equipment supports the geographical zone based resource selection, and the information further indicates a plurality of zone based radio resource pools, and
   the pedestrian user equipment is further configured to select a zone based radio resource pool from among the plurality of zone based radio resource pools according to a zone where the pedestrian user equipment exists.

7. The pedestrian user equipment according to claim 6, wherein
   the capability information indicates whether the pedestrian user equipment supports the geographical zone based resource selection where the pedestrian user equipment selects a resource pool depending on a geographical zone in which the pedestrian user equipment locates.

8. An apparatus for controlling a pedestrian user equipment, the apparatus comprising a processor and a memory coupled to the processor, the processor configured to perform processes of:
   transmitting capability information to a base station, the capability information indicating whether the pedestrian user equipment supports geographical zone based resource selection;
   individually receiving, from the base station, information indicating a geographical zone based radio resource pool for direct terminal-to-terminal communication, when the capability information indicates that the pedestrian user equipment supports the geographical zone based resource selection, and the information further indicates a plurality of zone based radio resource pools; and
   controlling the pedestrian user equipment to select a zone based radio resource pool from among the plurality of zone based radio resource pools according to a zone where the pedestrian user equipment exists.

9. The apparatus according to claim 8, wherein
   the capability information indicates whether the pedestrian user equipment supports the geographical zone based resource selection where the pedestrian user equipment selects a resource pool depending on a geographical zone in which the pedestrian user equipment locates.

10. A base station, comprising:
    a receiver; and
    a transmitter, wherein
    the receiver is configured to receive capability information from a pedestrian user equipment, the capability information indicating whether the pedestrian user equipment supports geographical zone based resource selection, and the information further indicates a plurality of zone based radio resource pools, and the transmitter is configured to individually transmit information indicating a geographical zone based radio resource pool for direct terminal-to-terminal communication to the pedestrian user equipment, when the capability information indicates that the pedestrian user equipment supports the geographical zone based resource selection, such that the pedestrian user equipment selects a zone based radio resource pool from among the plurality of zone based radio resource pools according to a zone where the pedestrian user equipment exists.

11. The base station according to claim 10, wherein the capability information indicates whether the pedestrian user equipment supports the geographical zone based resource selection where the pedestrian user equipment selects a resource pool depending on a geographical zone in which the pedestrian user equipment locates.

12. An apparatus for controlling a base station, the apparatus comprising a processor and a memory coupled to the processor, the processor configured to perform processes of:

receiving capability information from a pedestrian user equipment, the capability information indicating whether the pedestrian user equipment supports geographical zone based resource selection, and the information further indicates a plurality of zone based radio resource pools; and individually transmitting, to the pedestrian user equipment, information indicating a geographical zone based radio resource pool for direct terminal-to-terminal communication, when the capability information indicates that the pedestrian user equipment supports the geographical zone based resource selection, such that the pedestrian user equipment selects a zone based radio resource pool from among the plurality of zone based radio resource pools according to a zone where the pedestrian user equipment exists.

* * * * *